US010780505B2

(12) United States Patent
Jansson

(10) Patent No.: US 10,780,505 B2
(45) Date of Patent: Sep. 22, 2020

(54) FACE GROOVING TOOL BODY FOR METAL CUTTING

(71) Applicant: SANDVIK INTELLECTUAL PROPERTY AB, Sandviken (SE)

(72) Inventor: Gunnar Jansson, Sandviken (SE)

(73) Assignee: SANDVIK INTELLECTUAL PROPERTY AB, Sandviken (SE)

(*) Notice: Subject to any disclaimer, the term of this patent is extended or adjusted under 35 U.S.C. 154(b) by 30 days.

(21) Appl. No.: 16/093,113

(22) PCT Filed: Mar. 9, 2017

(86) PCT No.: PCT/EP2017/055588
§ 371 (c)(1),
(2) Date: Oct. 11, 2018

(87) PCT Pub. No.: WO2017/178157
PCT Pub. Date: Oct. 19, 2017

(65) Prior Publication Data
US 2019/0210115 A1 Jul. 11, 2019

(30) Foreign Application Priority Data
Apr. 14, 2016 (EP) ..................................... 16165316

(51) Int. Cl.
*B23B 27/04* (2006.01)
*B23B 27/22* (2006.01)
(Continued)

(52) U.S. Cl.
CPC ............ *B23B 27/04* (2013.01); *B23B 29/043* (2013.01); *B23B 29/06* (2013.01);
(Continued)

(58) Field of Classification Search
CPC ........ B23B 2200/0423; B23B 2205/02; B23B 27/04; B23B 29/043; B23B 29/06;
(Continued)

(56) References Cited

U.S. PATENT DOCUMENTS 4,604,004 A * 8/1986 Armbrust .............. B23B 27/045
407/110
6,579,044 B1 6/2003 Trenkwalder et al.
(Continued)

FOREIGN PATENT DOCUMENTS

EP 0416854 A1 3/1991
EP 1072344 B1 3/2003
(Continued)

*Primary Examiner* — Sara Addisu
(74) *Attorney, Agent, or Firm* — Corinne R. Gorski

(57) ABSTRACT

A face grooving tool body includes a blade portion having a top surface and an opposite bottom surface, a first side surface and an opposite second side surface, and a front end and an opposite rear end. A longitudinal axis of the blade portion coincides with a primary cutting feed direction of the blade portion. An upper blade portion is associated with the top surface and a lower blade portion is associated with the bottom surface, the upper and lower blade portions being separated by a slit. The second side surface of the lower blade portion is curved around a second side surface axis of curvature parallel to the longitudinal axis. A key hole is formed in the blade portion. The slit includes a slit portion that has the shape of a concave function in a side view.

14 Claims, 13 Drawing Sheets

(51) Int. Cl.
*B23B 29/04* (2006.01)
*B23B 29/06* (2006.01)

(52) U.S. Cl.
CPC ... *B23B 2200/0423* (2013.01); *B23B 2205/02* (2013.01); *B23B 2220/126* (2013.01)

(58) Field of Classification Search
CPC . B23B 2205/04; B23B 27/10; B23B 2250/12; B23B 27/045; B23B 2200/163; B23B 2200/167; B23B 2200/165
See application file for complete search history.

(56) References Cited

U.S. PATENT DOCUMENTS

| | | | | |
|---|---|---|---|---|
| 7,246,974 B2 * | 7/2007 | Hansson | ................ | B23B 27/04 407/109 |
| 7,264,424 B2 * | 9/2007 | Hansson | ................ | B23B 27/04 407/107 |
| 8,277,150 B2 * | 10/2012 | Watanabe | ............. | B23B 27/007 407/107 |
| 8,701,537 B2 * | 4/2014 | Baernthaler | .......... | B23B 27/045 83/839 |
| 2005/0129471 A1 * | 6/2005 | Englund | ............... | B23B 29/046 407/101 |
| 2008/0038072 A1 * | 2/2008 | Berminge | ............... | B23B 27/10 407/12 |
| 2009/0142149 A1 | 6/2009 | Niemi et al. | | |
| 2019/0084051 A1 * | 3/2019 | Noureddine | .......... | B23B 29/043 |

FOREIGN PATENT DOCUMENTS

| | | | | |
|---|---|---|---|---|
| EP | 2532460 A1 | | 12/2012 | |
| JP | 2009262323 A | * | 11/2009 | ........... B23B 27/045 |
| JP | 2017136670 A | * | 8/2017 | ............. B23B 27/16 |

* cited by examiner

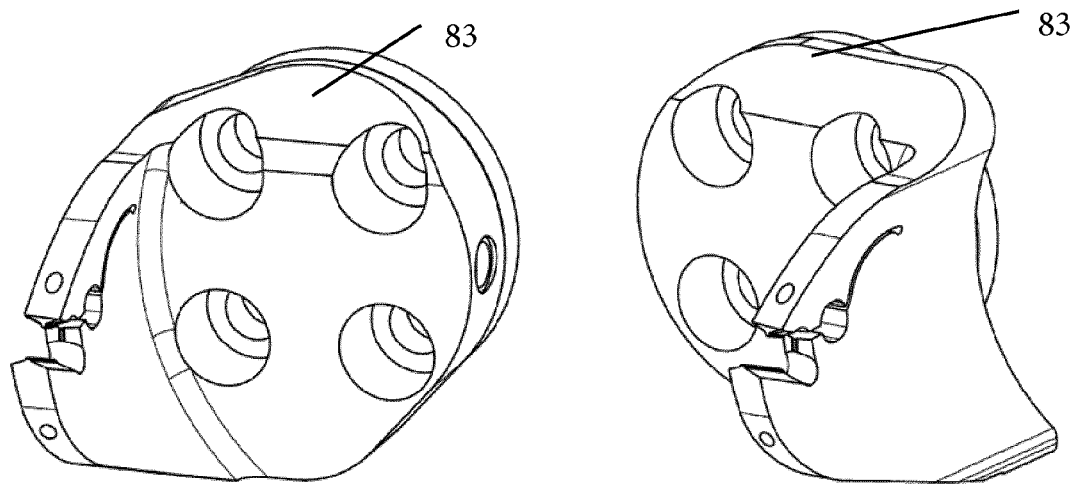
Fig. 11
Fig. 12
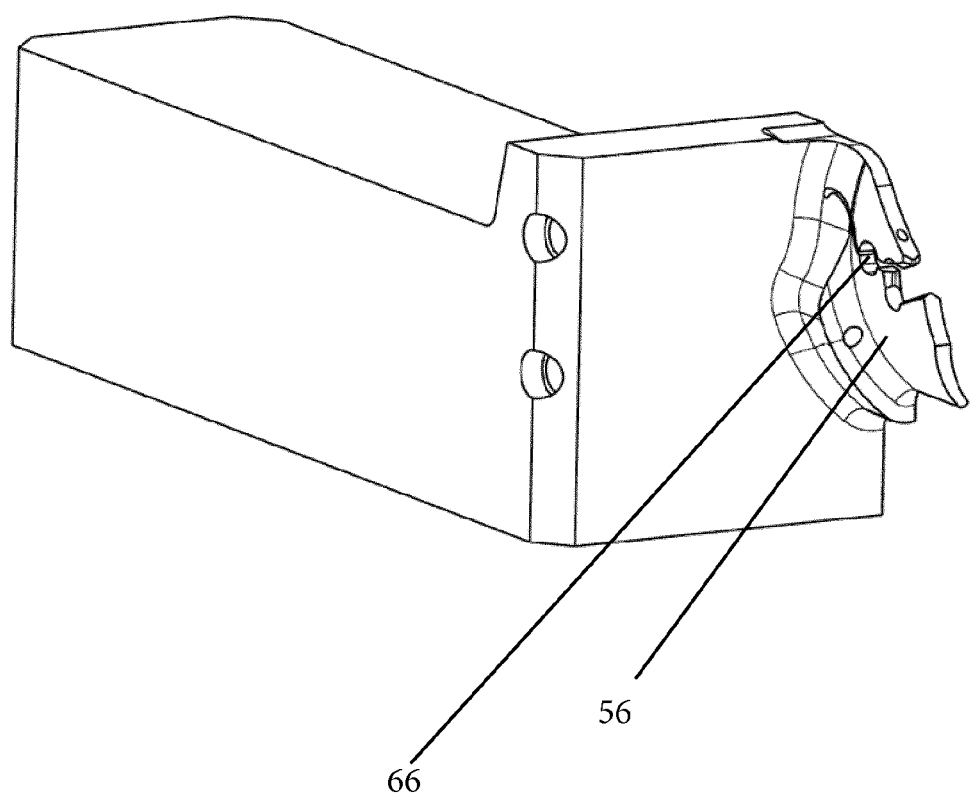
Fig. 13

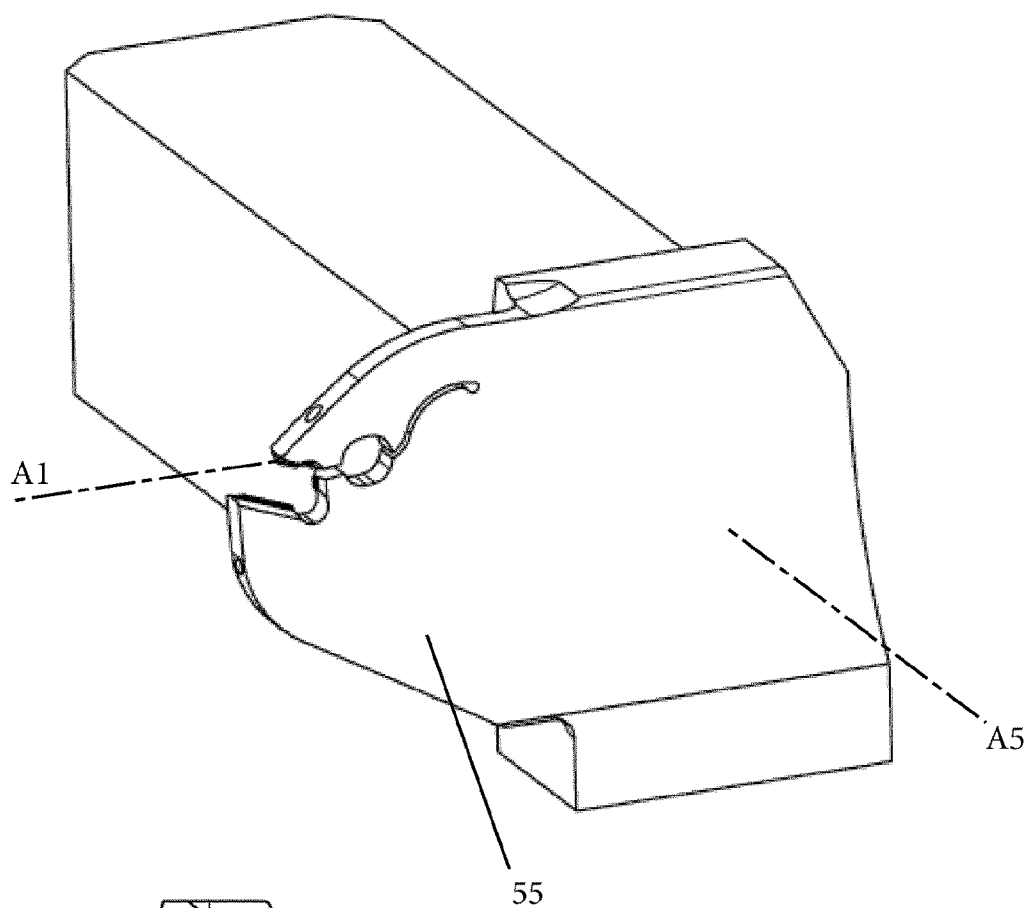
Fig. 14
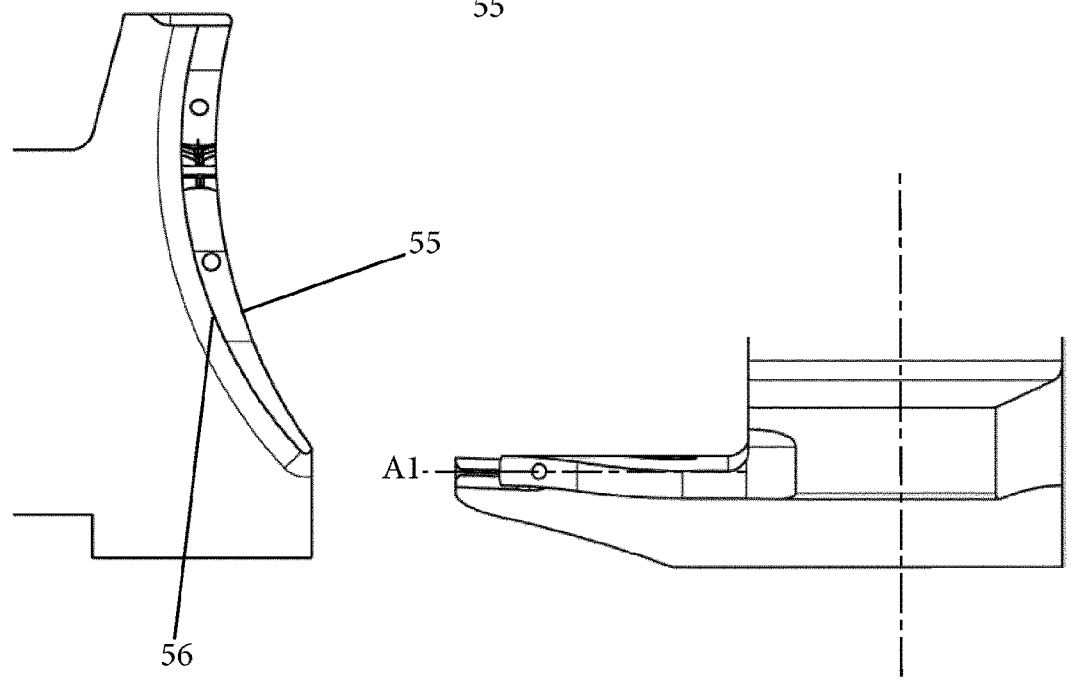
Fig. 15
Fig. 16

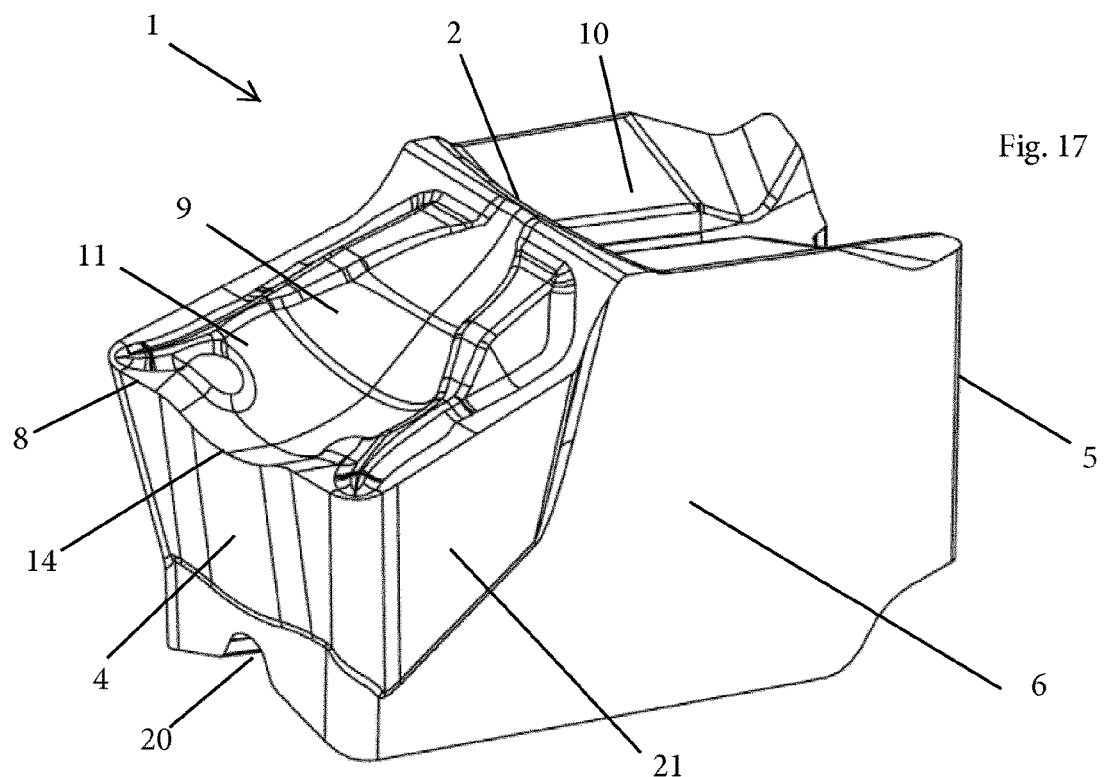
Fig. 17
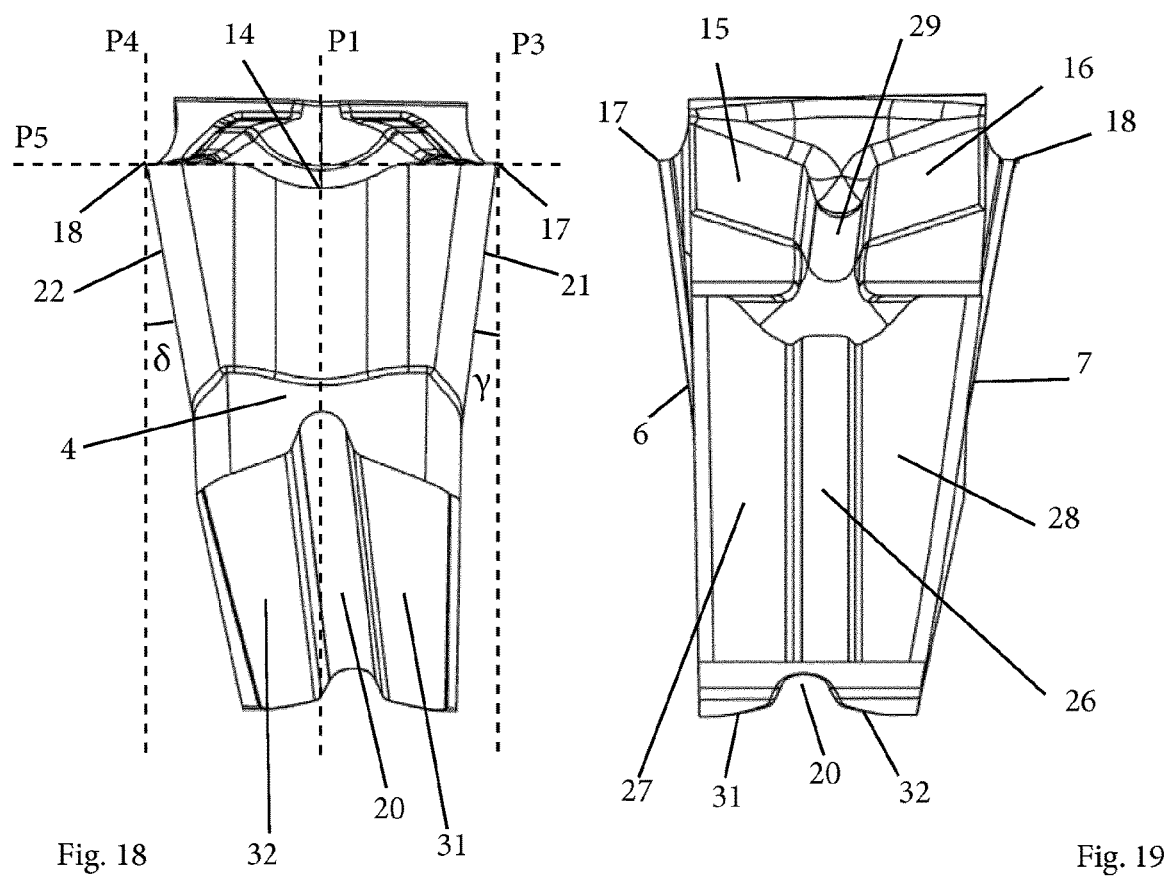
Fig. 18
Fig. 19

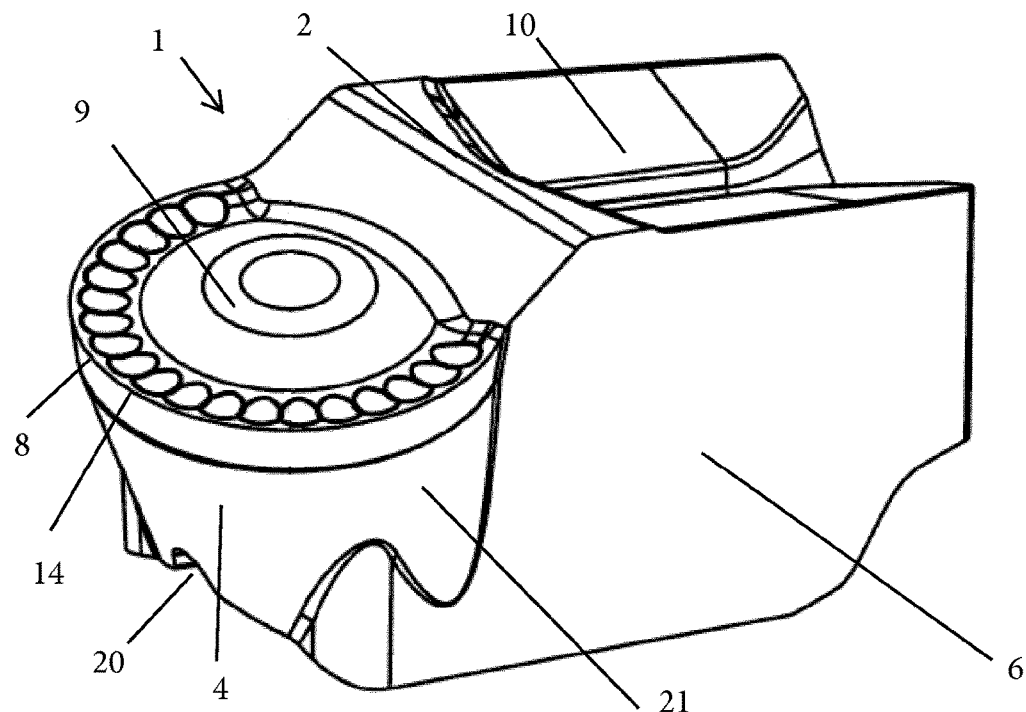
Fig. 24
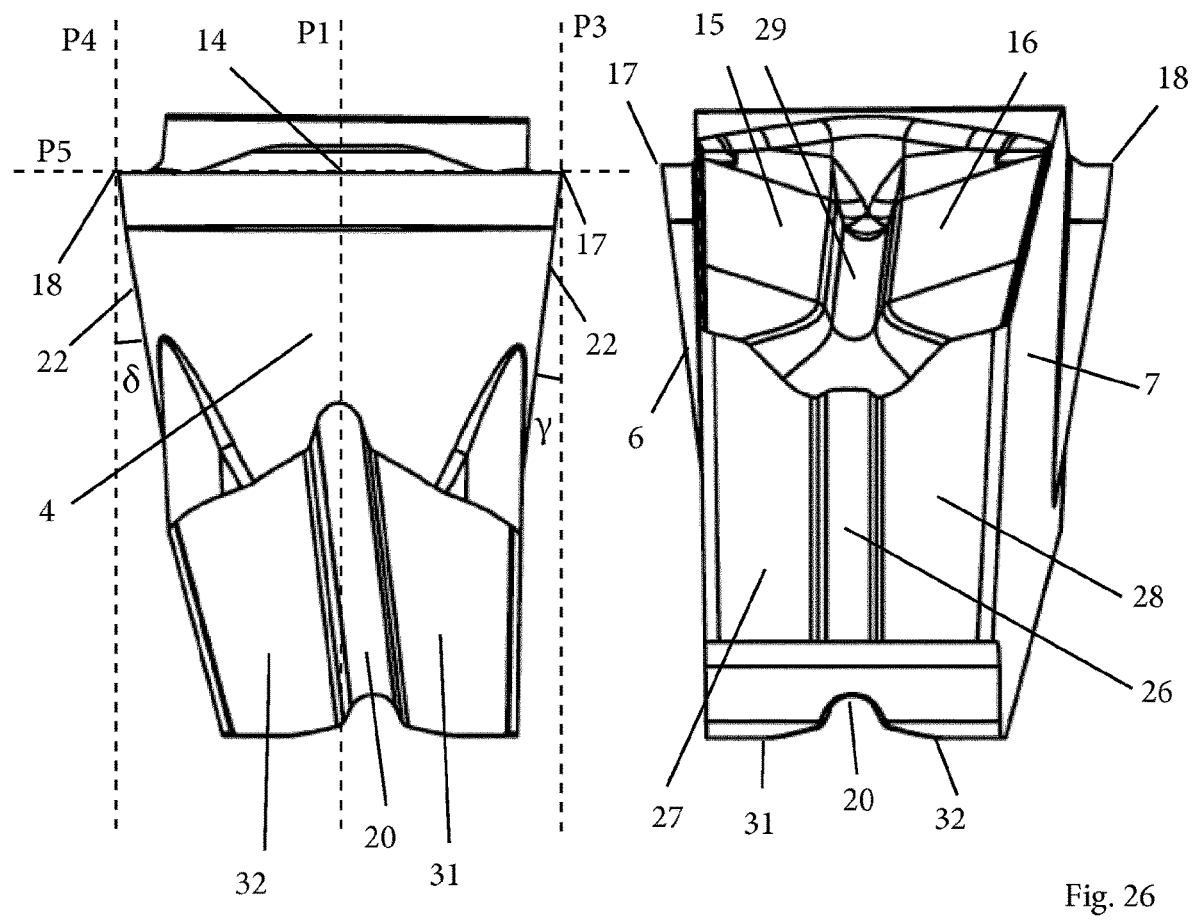
Fig. 25
Fig. 26

FACE GROOVING TOOL BODY FOR METAL CUTTING

RELATED APPLICATION DATA

This application is a § 371 National Stage Application of PCT International Application No. PCT/EP2017/055588 filed Mar. 9, 2017 claiming priority to EP 16165316.7 filed Apr. 14, 2016.

TECHNICAL FIELD OF THE INVENTION

The present invention belongs to the technical field of metal cutting. More specifically the present invention belongs to the field of face grooving tool bodies, in which a grooving insert is mountable, for use in metal cutting in machines such as computer numerical control, i.e. CNC, machines.

BACKGROUND OF THE INVENTION AND PRIOR ART

The present invention refers to a face grooving tool body including a blade portion comprising a top surface, an opposite bottom surface, a first side surface and an opposite second side surface, a front end and an opposite rear end. A longitudinal axis of the blade portion is coinciding with a primary cutting feed direction of the blade portion. The blade portion further comprising an upper blade portion associated with the top surface and a lower blade portion associated with the bottom surface, wherein the upper and lower blade portions are separated by a slit extending from the front end to a rear slit end, the slit intersecting the first and second side surfaces, the slit comprising an insert seat for a grooving insert, the insert seat opening in the front end. The insert seat comprising an upper clamping surface formed in the upper blade portion, an opposite lower support surface formed in the lower blade portion, and a rear support surface formed in the lower blade portion. The lower support surface extends a greater distance from the rear end than the distance the upper clamping surface extends from the rear end. The second side surface of the lower blade portion is curved around a second side surface axis of curvature extending parallel to the longitudinal axis. A key hole is formed in the blade portion.

Such face grooving tool body is known from EP1072344B1. FIG. 4.

A face grooving tool body can be used to produce, by metal cutting, a circular groove in a rotating metal work piece. The circular groove produced has a center which coincides with a rotational axis of the metal work piece. A primary cutting feed direction of the face grooving tool body is parallel to the rotational axis of the metal work piece. The face grooving tool body comprises an insert seat, in which a grooving insert can be mounted. For narrow and deep circular grooves, it is advantageous with a clamping mechanism of the grooving insert which works according to the principle that the insert seat can be opened by a movement, such as a rotation, of a key, which forces an upper and lower clamping jaw away from each other. When the key is not present, the insert is clamped by the upper and lower clamping jaws. The upper clamping jaw is therefore elastically deformable, or resiliently moveable, and is pivotable. Such a face grooving tool body has a distance between the upper and lower clamping jaws in an un-deformed state, i.e. no insert in the seat and no force applied by a key, which is smaller than the distance between upper and lower clamping surfaces of the grooving insert to be mounted in the insert seat. Such a clamping mechanism, also known as spring clamping, has the advantage that the efficiency of the clamping is at least partly irrespective of the depth and width of the groove, which can be machined or produced by the face grooving tool body. Such a clamping mechanism is effective only as long as the upper clamping jaw is not plastically deformed, because if the upper clamping jaw is plastically deformed, the clamping force is reduced.

In contrast, a so called screw clamping can efficiently be used only for relatively short grooves. This is because the distance from the screw to the active cutting edge is limiting the maximum grooving depth, and a longer grooving depth reduces the clamping efficiency. In a screw clamping mechanism, the distance between the upper and lower clamping jaws in an un-deformed state, i.e. no insert in the seat and no force applied by a screw, is larger than the distance between upper and lower clamping surfaces of the grooving insert to be mounted in the insert seat. In a screw clamping type face grooving tool body, by tightening of a screw a top clamping jaw is pressed towards a top surface of a grooving insert mounted in the seat.

A face grooving tool body for turning can structurally be defined as comprising blade portion, where at least a lower blade portion is curved around an axis parallel to a primary cutting feed direction. Preferably, the side surfaces of the blade portion are curved around an axis or axes parallel to the primary cutting feed direction. A distance between first and second side surfaces is smaller than a width of a cutting edge of a grooving insert receivable in the insert seat.

Since a screw clamping provides for a range of possible torque calues when tightening of a clamping screw, there is a risk of altering the curvature or shape of the side surfaces of a blade portion, especially the lower blade portion, if over-tightening the screw. This can result in deforming of the blade portion of the face grooving tool body, which can lead to incorrect diameter of the circular groove to be formed, since the curvature of the blade portion needs to correspond to the diameter of the circular groove to be formed.

The face grooving tool body known from EP1072344B1, FIG. 4, comprises a curved holder blade. For opening an insert seat, a key slot and a key recess is provided for simultaneous co-operation with a key. A turning of the key cause the opening of the insert seat, such that a grooving insert can be positioned. A resilient force cause the height of an insert-receiving slot to decrease when the key is removed is returned to an at-rest position. During clamping, i.e. when the insert is mounted in the insert seat, the insert is clamped at a constant or predetermined force, provided that the deformation of the upper clamping jaw is elastic, and provided that grooving inserts positioned in the insert seat have a constant or predetermined height, more precisely distance between upper clamping and lower support surface.

SUMMARY OF THE INVENTION

The inventor has found that the spring clamp face grooving tool body disclosed in EP1072344B1, FIG. 4, can be further improved with respect to the service life. A primary object of the present invention is to provide a face grooving tool body having an improved service life.

This object is achieved by the face grooving tool body as initially defined, characterized in that the slit comprises a slit portion, wherein the slit portion extends between a slit portion front end and a slit portion rear end, wherein the slit portion is located between the rear slit end and the insert seat, wherein a distance from the bottom surface to the rear slit end is greater than a distance from the bottom surface to the slit portion front end where the distances are measured in planes perpendicular to the longitudinal axis, and wherein the slit portion or a major portion of the slit portion has the shape of a concave function in a side view.

By such a face grooving tool body comprising a slit portion, the risk of exceeding the yield stress of the blade portion through plastically bending the upper blade portion, more specifically a portion between the rear end of the slit and the top surface, is reduced. Thereby the service life of the blade portion is increased.

By such a face grooving tool body, the risk of elastically or plastically deforming the lower blade portion during machining is reduced, thereby reducing the risk of the machined circular groove having an incorrect, or too great, diameter.

By such a face grooving tool body, the force necessary in order to open the insert seat is reduced.

By designing the blade portion such that a distance from the bottom surface to the slit portion rear end is greater than a distance from the bottom surface to the slit portion front end, the risk of plastically deforming the lower blade portion is reduced; thereby the service life of the blade portion is increased. Further, by increasing the volume of material of the lower blade portion, the mechanical strength of the lower blade portion is increased; thereby the risk of bending of the lower blade portion during cutting is reduced.

The face grooving tool body may be in the form of a shank tool, i.e. a tool having a square shaped or rectangular shaped cross section of a rear end thereof. The rear end of the face grooving tool can be coupled, directly or indirectly, to a CNC-lathe.

The face grooving tool body has a primary cutting feed direction, which is a direction parallel to a rotational axis of a metal work piece in which a circular groove is to be formed.

The blade portion comprises a top surface and an opposite bottom surface, a first side surface and an opposite second side surface. The areas of the first and second side surfaces are preferably greater than the areas of the top and bottom surfaces. The areas of the first and second side surfaces are preferably substantially equal, i.e. the difference in area size is preferably less than 20%. The bottom and/or the top surface may be in the form of a rounded surface or in the form of an edge which borders to the first and second side surfaces.

The blade portion comprises a front end and an opposite rear end. The front end is ahead of the rear end in the primary cutting feed direction. The distance between the front end and the rear end, along or parallel to the longitudinal axis, defines a maximum grooving depth for the blade portion. The blade portion is a single piece body, e.g. formed from one piece of steel.

A longitudinal axis of the blade portion intersects the blade portion, preferably both the upper and lower blade portions, and coincides with a primary cutting feed direction of the blade portion, which is a direction parallel to a rotational axis of a metal work piece in which a circular groove is to be formed.

"Front" or "forward" directions or positions, as well as the expression "ahead of", referring to features of the blade portion, refers to the primary cutting feed direction. Expressions such as "rear" and "rearward" consequently refers to the opposite direction.

An upper blade portion is associated with the top surface. In other words, the upper blade portion comprises at least a part of the upper surface. A lower blade portion is associated with the bottom surface. In other words, the lower blade portion comprises at least a part of the bottom surface.

"Upper" and "top", and similar words such as "higher", refers to the side or direction of a rake face for an active cutting edge of a grooving insert mounted in the insert seat. "Bottom" or "lower" consequently refers to the side or direction of the bottom support surface of said grooving insert. In other words, a rake face for an active cutting edge of a grooving insert mounted in the insert seat is higher than the bottom support surface of said insert.

The upper and lower blade portions are separated by a slit, or a slot, extending from, and opening in, the front end to a rear slit end. The slit runs uninterrupted from the insert seat to the rear slit end. The upper and lower blade portions are thus separated from the rear slit portion to the front end, and are permanently connected rearward of the rear slit end. In other words, the upper and lower blade portions are formed as a singular body, preferably from a single piece of metal.

The slit intersects, or opens in, the first and second side surfaces.

The slit comprising an insert seat, or recess, for a grooving insert, which insert seat opening in the front end. A grooving insert can thus be placed in the insert seat from the front.

The insert seat comprising an upper clamping surface formed in the upper blade portion, to be in contact with a top support surface of a grooving insert. A top surface of the grooving insert comprises the top support surface and a rake face.

The insert seat comprises a lower support surface, opposite or facing the upper clamping surface. The lower support surface is formed in the lower blade portion. The lower support surface is to be in contact with a bottom support surface of the grooving insert placed in the insert seat.

Preferably the area of the lower support surface is greater than the area of the upper clamping surface. Preferably the lower support surface extends a greater distance in the primary cutting feed direction the upper clamping surface.

An extension of the lower support surface and the longitudinal axis preferably converge in a front or forward direction, and diverge in an opposite rear or rearward direction, where primary cutting feed direction is in the front direction. In other words, the lower support surface is preferably in an opposite direction to the primary cutting feed direction sloping or tilting towards the bottom surface.

The upper blade portion comprises the upper clamping surface. The lower blade portion comprises the lower support surface. The upper clamping surface and the lower support surface are preferably parallel or substantially parallel.

A rear support surface, acting as a rear stop for the grooving insert, is formed in the lower blade portion.

Preferably a distance from the front end to the rear slit end is at least two times greater than a distance from the front end to the rear support surface, where the distances are measured parallel to the longitudinal axis.

The upper clamping surface and the rear support surface preferably form an obtuse angle relative to each other, preferably in the range of 95-130°. The lower support surface and the rear support surface preferably form an acute angle relative to each other, preferably in the range of 50-85°.

The lower blade portion and the lower support surface extends a greater distance from the rear end of the blade portion, than the distance the upper blade portion and the upper clamping surface extends from the rear end of the blade portion. In other words, the lower support surface, or at least a portion of the lower support surface, is ahead of, or extends further than the upper clamping surface, in the primary cutting feed direction.

The second side surface of the lower blade portion, i.e. one of the side surfaces of the blade portion extending between the lower support surface and the bottom surface, is curved around a second side surface axis of curvature A4 parallel to the longitudinal axis A1. Curved in this context means that the second side surface of the lower blade portion has a constant or substantially constant radius of curvature in a front view. Preferably, the first and second side surfaces are curved around an axis or axes parallel to the longitudinal axis A1. Preferably a radius or radii of curvature is less than or equal to 500 mm. preferably a radius or radii of curvature is at least 20 mm.

Preferably the width, or thickness, i.e. the distance between the first and second side surfaces, of the lower blade portion is constant or substantially constant along axes parallel to the longitudinal axis, from the front and at least a distance towards the rear end.

A key hole, or an opening for a key, in the form of a laterally extending through hole is formed in the blade portion, in which a key can be inserted in order to open the insert seat. The key hole extends between the first and second side surfaces.

The key hole is preferably shaped such that a key having a non-circular cross section can be inserted into the key hole, whereby a rotation of the key causes the upper blade portion to pivot around the rear slit end such that the distance between the upper clamping surface and the lower support surface increases. In this open state, a grooving insert may be removed from the insert seat. The key is rotatable around an axis perpendicular to the primary cutting feed direction and perpendicular to the longitudinal axis. Alternatively, the blade portion may comprise a pair of key holes, which may be circular or non-circular in shape, and which pair of key holes may be formed in the upper and lower blade portions.

The slit preferably comprises a connecting portion, located between the slit portion and the insert seat, and preferably intersecting the insert seat between the rear support surface and the upper clamping surface.

The slit comprises a slit portion extending between a slit portion front end and a slit portion rear end, which slit portion rear end preferably is adjacent to the rear slit end.

The slit portion is located, or positioned, between the rear slit end and the insert seat.

A slit gap, or the shortest distance, or space, between the upper and lower blade portions defined by the slit, varies along the slit. A slit gap at the insert seat, more specifically a distance between the upper clamping surface and the lower support surface, is greater than a slit gap at the slit portion. The slit gap at the slit portion is preferably constant or substantially constant.

A distance from the bottom surface to the slit portion rear end is greater than a distance from the bottom surface to the slit portion front end, measured in planes perpendicular to the longitudinal axis. Formulated differently, the distance between the slit portion rear end the part of the bottom surface closest to the slit portion rear end is greater than the distance between the slit portion front end and the part of the bottom surface closest to the slit portion front end. Thus, the slit portion is rising towards the rear end and away from the front end in a side view where the top surface is upwards and the bottom surface is downwards.

Preferably, the distance from the bottom surface to the slit portion rear end is at least 5% greater but not more than 80% greater than the distance from the bottom surface to the slit portion front end.

The slit portion 68 or a major portion, i.e. at least 50% of the length, of the slit portion, has the shape of a concave function in a side view, where the top surface is upwards and the bottom surface is downwards and the longitudinal axis A1 is horizontal. The slit portion or a major portion of the slit portion thus in a side view has the shape of a concave function. More precisely, in a side view the upper and lower boundary lines of the slit portion, formed by the upper and lower blade portion respectively, has the shape of a concave function. In other words, the lower blade portion adjacent to the slit portion is convex, and the upper blade portion adjacent to the slit portion is concave.

More precisely, the slit portion or a major portion of the slit portion is curved or substantially curved around an axis, or axes, which axis or axes intersect the lower blade portion, which axis or axes are substantially perpendicular to the longitudinal axis. In other words, one or more centers of curvature of the slit portion or a major portion of the slit portion intersect the lower blade portion.

In order to reduce the force necessary to open the insert seat, the slit portion preferably has a length, i.e. a distance between the slit portion rear end and the slit portion front end, which is greater than the length of the lower support surface.

According to one embodiment of the invention the slit comprises the key hole, wherein the slit portion is located between the rear slit end and the key hole, wherein a slit gap intersecting a center of the key hole is greater than a slit gap at the slit portion.

By such a face grooving tool body, the lower blade portion as well as the upper blade portion can have a higher mechanical strength, because no hole or recess for a key needs to be formed in the lower and upper blade portions in order to open the insert seat.

By such a face grooving tool body, subsequent openings of the insert seat can be made with less variation. In other words, the upper clamping surface will move a substantially predetermined distance during opening regardless of the torque used by the holder of the key.

The key hole is arranged such that a non-circular key section of a key is insertable in the key hole, and such that a rotation of the non-circular key section a predetermined angle, e.g. 90°, around an axis perpendicular to the longitudinal axis A1, causes the upper blade portion to pivot around the rear slot end such that the distance between the upper clamping surface and the lower support surface increases.

Preferably the key hole is shaped such as opening of the insert seat is achievable by opposite rotations of the key. In other words, preferably the insert seat can be open by both clock-wise and counter clock-wise rotation of the key. The key is rotatable around an axis perpendicular to the primary cutting feed direction and perpendicular to the longitudinal axis.

Preferably the key hole comprises a first and a second concave surface, formed in the upper blade portion, and connected by a first flat surface, wherein the key hole further comprises a third and a fourth concave surface formed in the lower blade portion and connected by a second flat surface.

The key hole preferably comprises substantially opposite openings towards the insert seat and towards the slit portion, respectively. In other words, the key hole is part of the slit. The slit comprises the key hole.

The slit preferably comprises a connecting portion, connecting the key hole and the insert seat, and preferably intersects the insert seat between the rear support surface and the upper clamping surface.

The slit comprises a slit portion extending between a slit portion front end and a slit portion rear end, which slit portion rear end preferably is adjacent to the rear slit end.

The slit portion is located, or is positioned, between the rear slit end and the key hole. In other words, the slit portion connects the rear slit end and the key hole.

A slit gap, or the shortest distance, or space, between the upper and lower blade portions defined by the slit, varies along the slit. A slit gap at the key hole, more specifically at the center of the key hole, or intersecting a center of the key hole, is greater than a slit gap at the slit portion. In other words, a greatest slip gap at the key hole is greater than a greatest slit gap at the slit portion. The slit gap at the slit portion is preferably constant or substantially constant.

A second connecting portion, preferably convex in side view, is preferably located between and connecting the key hole and the slit portion.

The length of the slit portion, defined as a distance between the slit portion front end and the slit portion rear end, is greater than the length of the key hole.

According to one embodiment of the invention, a width of the lower blade portion, measured as the distance between the first and second side surfaces of the lower blade portion, is decreasing from the lower support surface towards the bottom surface of the lower blade portion.

By such a face grooving tool body, the diameter range of circular grooves which can be machined is increased.

A width, or thickness, of the lower blade portion, measured as the perpendicular distance between the first and second side surfaces of the lower blade portion, is gradually decreasing from the lower support surface towards the bottom surface of the lower blade portion. For example, the first and second side surface may be curved around different axes both parallel to the longitudinal axis. In other words, the lower blade portion is tapered towards the bottom surface.

According to one embodiment of the invention, the first side surface is curved around a first side surface axis of curvature, wherein the first side surface axis of curvature is parallel to the longitudinal axis, wherein second side surface is curved around the second side surface axis of curvature, wherein the first side surface is facing the first and second side surface axes of curvature and, wherein a distance from the first side surface to the first side surface axis of curvature is greater than a distance from the first side surface to the second side surface axis of curvature.

By such a face grooving tool body, a predetermined diameter range of circular grooves can be machined while a high mechanical strength of the blade portion can be achieved.

According to one embodiment of the invention, a lower support surface central axis forms an angle 1-45° relative to the longitudinal axis in a side view such that the lower support surface central axis and the longitudinal axis in a side view converge forward of the front end.

By such a face grooving tool body, less clamping force is necessary in order to clamp a grooving insert in the insert seat.

By such a face grooving tool body, the risk of chip jamming, i.e. chips not removed from the machined groove, is reduced. If the insert is positioned horizontal in a side view, the upper blade portion needs to be closer to the active cutting edge in order to give sufficient clamping force, resulting in reduced space for chips. On the other hand, if the lower support surface central axis forms an angle 1-45° relative to the longitudinal axis in a side view, the upper blade portion can be relatively lower and/or rearward, resulting in increased space for chips.

The lower support surface central axis is an axis along which a central structure, preferably a ridge or a groove, of the lower support surface extends. The central structure of the lower support surface preferably separates two major support surfaces located in different planes. In a side view, where the longitudinal axis is horizontal, the lower support surface central axis and the longitudinal axis converge, or intersect, forward of the front end. Since the lower support surface central axis in a top view preferably forms an angle 0.5-5.0° relative to the longitudinal axis, the lower support surface central axis and the longitudinal axis do not converge in a singular point. However, said axes still converge in the sense that a shortest distance between extensions of said axes is located forward of the front end, i.e. in the primary cutting feed direction.

In other words, the lower support surface is not parallel to the longitudinal axis. Rather, the lower support surface is sloping downwards in the rear or rearward direction, i.e. in the direction opposite the primary cutting feed direction. In other words, a rear surface of a grooving insert in the seat is relatively lower, i.e. closer to the bottom surface or further away from the top surface or further away from the longitudinal axis, than a front surface of the grooving insert.

Thus, preferably a distance from a rear end of the lower support surface to the bottom surface of the blade portion is smaller than a distance from a front end of the lower support surface to the bottom surface of the blade portion.

Preferably, an upper support surface central axis is parallel to or substantially parallel to the lower support central axis. By such a face grooving tool body, chip evacuation is improved because there is more space for chips.

According to one embodiment of the invention, a distance from a rear central end of the lower support surface to the first side surface is shorter than a distance from a corresponding front central end of the lower support surface to the first side surface, where said distances are measured in planes perpendicular to the longitudinal axis.

By such a face grooving tool body, the lower support surface can be arranged in a manner which is not parallel to the longitudinal axis, while allowing the bottom support surface to arranged in a more uniform manner. More specifically, a central structure of the lower support surface, such as a central ridge or a central groove, can be formed such that the central structure is arranged between and at substantially equal distances from both the first and second side surfaces, respectively.

Thus, especially in combination when a lower support surface central axis forms an angle 1-45° relative to the longitudinal axis in a side view such that the lower support surface central axis and the longitudinal axis in a side view converge forward of the front end, the central structure can be arranged between and at substantially equal distances from both the first and second side surfaces, respectively. This give the advantage that the stability of the location of a grooving insert mounted in the insert seat is improved.

In other words, a distance from the a rear central end structure of the lower support surface to the first side surface is shorter than a distance from a corresponding front central end structure of the lower support surface to the first side surface. The rear and front central ends of the lower support surface thus comprise corresponding structures or corresponding structural elements, such as a top of a ridge or a bottom of a groove, which preferably extends along, i.e. from the rear to the front, the lower support surface. Central in this context has the meaning of a position between the first and second side surfaces.

In other words, a central structure of the lower support surface has an extension which is not parallel to the longitudinal axis. Rather, the central structure in a top view forms an angle, preferably 0.5-5.0°, relative to the longitudinal axis. Formulated differently, a lower support surface central axis, along which a central structure of the lower support surface extends, forms an angle, preferably 0.5-5.0°, relative to the longitudinal axis in a top view.

Preferably, the upper clamping surface is constructed in a corresponding manner, i.e. such that a distance from a rear central end of the upper clamping surface to the first side surface is shorter than a distance from a corresponding front central end of the upper clamping surface to the first side surface. In other words, an upper clamping surface central axis, along which a central structure of the upper clamping surface extends, forms an angle relative to the longitudinal axis in a top view, wherein the angle is equally great as the angle which the lower support surface central axis forms relative to the longitudinal axis in a top view.

According to one embodiment of the invention, the slit portion has a constant or substantially constant slit gap.

By such a face grooving tool body, the slit portion can be manufactured in a cost-efficient way, such as using a solid end mill having a constant diameter, or by means of electrical discharge machining, or any other suitable metal removal method.

The slit gap, or the distance between the upper and lower blade portions, for the slit portion is preferably 0.1-2.0 mm, even more preferably 0.2-1.0 mm, and even more preferably 0.3-0.5 mm. Substantially constant in this context means that the smallest slip gap at the slip portion is at least 80% of the largest slip gap at the slip portion.

Preferably, the rear slit end has a greater slit gap than the gap at the slit portion.

According to one embodiment of the invention, first and second side surfaces of the lower blade portion are formed as continuous surfaces which run uninterrupted from the slit to the bottom surface.

By such a face grooving tool body, the service life of the face grooving tool body can be further increased, because of increased mechanical strength of the lower blade portion.

The first and second side surfaces of the lower blade portion do not comprise any through hole. Preferably, also the first and second side surfaces of the upper blade portion are formed as continuous surfaces which run uninterrupted from the slit to the top surfaces.

According to one embodiment of the invention, a width of the upper and lower blade portions along axes parallel to longitudinal axis A1, is constant or substantially constant from the front end to the key hole.

Thus, a width, or a distance between the first and second side surfaces, of the upper and lower blade portions, is constant or substantially constant parallel to the primary cutting feed direction, for a distance, which is at least up to a plane perpendicular to the longitudinal axis and comprising the key hole, from the front end and towards the rear end of the blade portion. Preferably, said distance is constant from the front end to the rear end. Said distance is a maximum grooving distance, for a face grooving operation, in other words in an operation where a circular groove is formed, where the primary grooving direction is parallel to the rotation axis of the work piece in which the circular groove is formed.

According to one embodiment of the invention, the blade portion comprises a fluid channel, wherein the fluid channel comprises a first fluid channel portion in the lower blade portion having an outlet opening into the slit, wherein the fluid channel comprises a second fluid channel portion in the upper blade portion having an inlet opening into the slit, wherein the second fluid channel portion is a through hole, wherein the first fluid channel portion and the second fluid channel portion extend along a common axis.

By such a face grooving tool body, a fluid channel can be arranged directed towards a cutting zone in a more irrespective of the shape and extension of the slit portion.

By such a face grooving tool body, chips or other particles which may be stuck inside the slit can be removed by flushes of coolant.

The outlet of the first fluid channel portion in the lower blade portion is opposite the inlet of second fluid channel portion in the upper blade portion, in other words, said outlet and inlet intersects opposite limiting surfaces of the slit. Preferably, the gap of the slit portion is less than 1 mm, in order to reduce the leakage of fluid.

According to one embodiment of the invention, a distance from the bottom surface to a lowest point of the insert seat is smaller than a distance from the bottom surface to the key hole, where the distances are measured in planes perpendicular to the longitudinal axis.

By such a face grooving tool body, the mechanical strength of the lower blade portion is further increased, thereby increasing the service life of the face grooving tool body.

The lowest point of the insert seat in this context is a point of the insert seat located a greatest distance from the longitudinal axis. A distance from the bottom surface to a lowest point of the insert seat is also smaller than a distance from the bottom surface to the connecting portion, the slit portion and the rear end of the slit, respectively. In other words, the rear end of the insert seat is the lowest portion of the slit in a side view.

According to one embodiment of the invention, the face grooving tool body comprises a clamping portion extending along a longitudinal center axis which is parallel to or perpendicular to the longitudinal axis, wherein the clamping portion comprises a top surface and an opposite bottom surface, wherein a distance from the bottom surface of the clamping portion to the top surface of the blade portion is greater than a distance from the bottom surface of the clamping portion to the top surface of the clamping portion, where the distances are measured in planes perpendicular to the longitudinal axis, and wherein the blade portion is permanently connected to the clamping portion.

The face grooving tool body thus comprises a clamping portion extending along a longitudinal center axis, preferably in the form of a square shank, i.e. an elongated body having a square or rectangular cross section perpendicular to the longitudinal center axis. The clamping portion s attachable or connectable directly or indirectly to a machine tool, such as a turning lathe. The face grooving tool body is preferably a singular body, in other words, the clamping portion is preferably permanently connected to the rear end of the blade portion.

A distance from the rear end of the lower support surface to a plane comprising a bottom surface of the clamping portion is shorter than a distance from the front end of the lower support surface to a plane comprising a bottom surface of the clamping portion. The longitudinal axis preferably is located in a plane comprising the top surface of clamping portion.

According to one embodiment of the invention, the distance between the top and bottom surfaces, measured in planes perpendicular to the longitudinal axis, is increasing from the front end towards the rear end up to at least the rear end of the slit portion.

By such a face grooving tool body, the mechanical strength of the blade portion is further increased, thereby increasing the service life of the face grooving tool body.

Thus, the height of the blade portion in a side view, where the longitudinal axis is horizontal, is increasing from the front end in a rearward direction, at least up to the rear end of the slit portion.

According to one embodiment of the invention, a face grooving tool comprises a face grooving tool body and a grooving insert positioned in the insert seat, the grooving insert comprising a top support surface in contact with the upper clamping surface, an opposite bottom support surface in contact with the lower support surface, and a rear support surface in contact with the insert seat rear support surface, a first side surface and an opposite second side surface, a cutting edge extending continuously or substantially continuously between a first end point and a second end point, wherein the cutting edge is arranged symmetrically or substantially symmetrically relative to a first plane, wherein the first plane intersects a mid-point of the cutting edge and intersects the rear surface, wherein at least 50% of the cutting edge is located in a reference plane, wherein the longitudinal axis extends in the intersection between the first plane and the reference plane.

According to one embodiment of the invention, a face grooving tool comprising a face grooving tool body a grooving insert positioned in the insert seat, the grooving insert comprising a front surface and an opposite rear surface, a first side surface and an opposite second side surface, a top surface and an opposite bottom surface, the top surface comprising a top front portion and a top rear portion, the top front portion comprising a rake face and a cutting edge, the cutting edge is at least partly formed in an intersection between the rake face and the front surface, the cutting edge extends continuously or substantially continuously between a first end point and a second end point, the cutting edge is arranged symmetrically or substantially symmetrically relative to a first plane comprising the longitudinal axis, the first plane and the longitudinal axis intersects a mid-point of the cutting edge and intersects the rear surface, the top rear portion comprising a top support surface in contact with the upper clamping surface, the bottom surface comprising a bottom support surface in contact with the lower support surface, the bottom surface is symmetrically or substantially symmetrically arranged in relation to a second plane, the second plane intersects the front surface and the rear surface, and wherein the first plane and the second plane forms an angle α of 0.5-5.0° relative to each other.

DESCRIPTION OF THE DRAWINGS

The present invention will now be explained in more detail by a description of different embodiments of the invention and by reference to the accompanying drawings.

FIG. 11 is a perspective view of a face grooving tool body according to a second embodiment.

FIG. 12 is a perspective view of a face grooving tool body according to a third embodiment.

FIG. 13 is a perspective view of a face grooving tool body according to a fourth embodiment.

FIG. 14 is a perspective view of a face grooving tool body according to a fifth embodiment.

FIG. 15 is a front view of the face grooving tool body in FIG. 14.

FIG. 16 is a top view of a face grooving tool body in FIG. 14.

FIG. 17 is a perspective view of the grooving insert in FIG. 1.

FIG. 18 is a front view of the grooving insert in FIG. 17.

FIG. 19 is a rear view of the grooving insert in FIG. 17.

FIG. 24 is a perspective view of second grooving insert.

FIG. 25 is a front view of the grooving insert in FIG. 24.

FIG. 26 is a rear view of the grooving insert in FIG. 24.

All drawings or figures have been drawn to scale.

DETAILED DESCRIPTION OF EMBODIMENTS OF THE INVENTION

Figure 1:
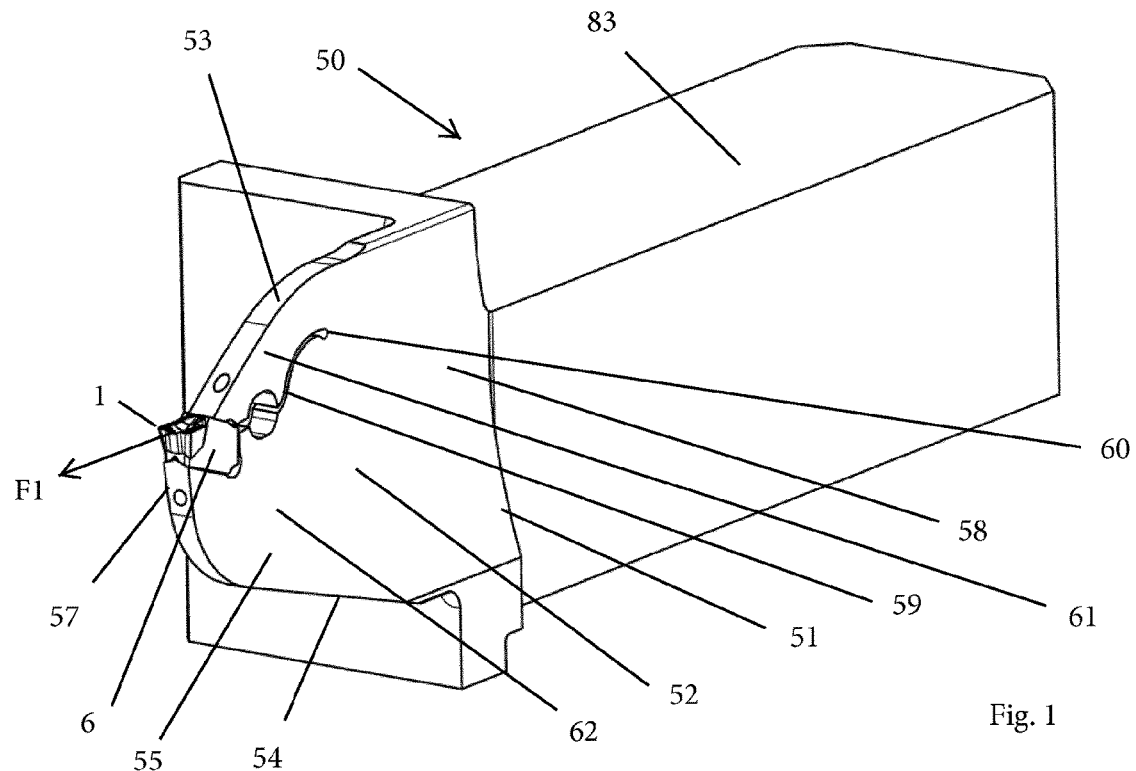
FIG. 1 is a perspective view of a face grooving tool comprising a face grooving tool body according to a first embodiment and a grooving insert.

Reference is made to FIG. 1, which show a face grooving tool 50 comprising a face grooving tool body 51 according to a first embodiment and a grooving insert 1 positioned in an insert seat. The grooving insert 1 is made from a harder material, e.g. cemented carbide, than the face grooving tool body 51, which is made from steel. The face grooving tool body 51 comprises a blade portion 52. The blade portion 52 comprises a top surface 53, an opposite bottom surface 54, a first side surface 55 and an opposite second side surface (not shown), a front end 57 and an opposite rear end 58. A longitudinal axis of the blade portion 52 coincides with a primary cutting feed direction F1 of the blade portion 52. The primary cutting feed direction F1, which defines a front or forward direction of the face grooving tool 50, is the direction in which the face grooving tool 50 moves during cutting or machining relative to a rotating metal work piece, in which a circular groove is formed. The circular groove has a width which corresponds to the width of a main cutting edge of the grooving insert 1 of the face grooving tool 50. An upper blade portion 61 associated with the top surface 53 and a lower blade portion 62 associated with the bottom surface 54 are separated by a slit 59 extending from the front end 57 to a rear slit end 60. The upper blade portion and lower blade portions 61, 62 are permanently connected rearward of the rear slit end 60. The slit 59 intersects, or opens into, the first and second side surfaces 55, 56. The slit 59 comprises an insert seat 63 for the grooving insert 1 which opens in the front end 57. The face grooving tool body 51 comprises a clamping portion 83, in the form of a shank having a square shaped cross section, extending in a direction parallel to the longitudinal axis A1. The blade portion 52 and the clamping portion 83 are permanently connected, more precisely; they are one singular unit formed from a singular piece of metal.

Figure 2:
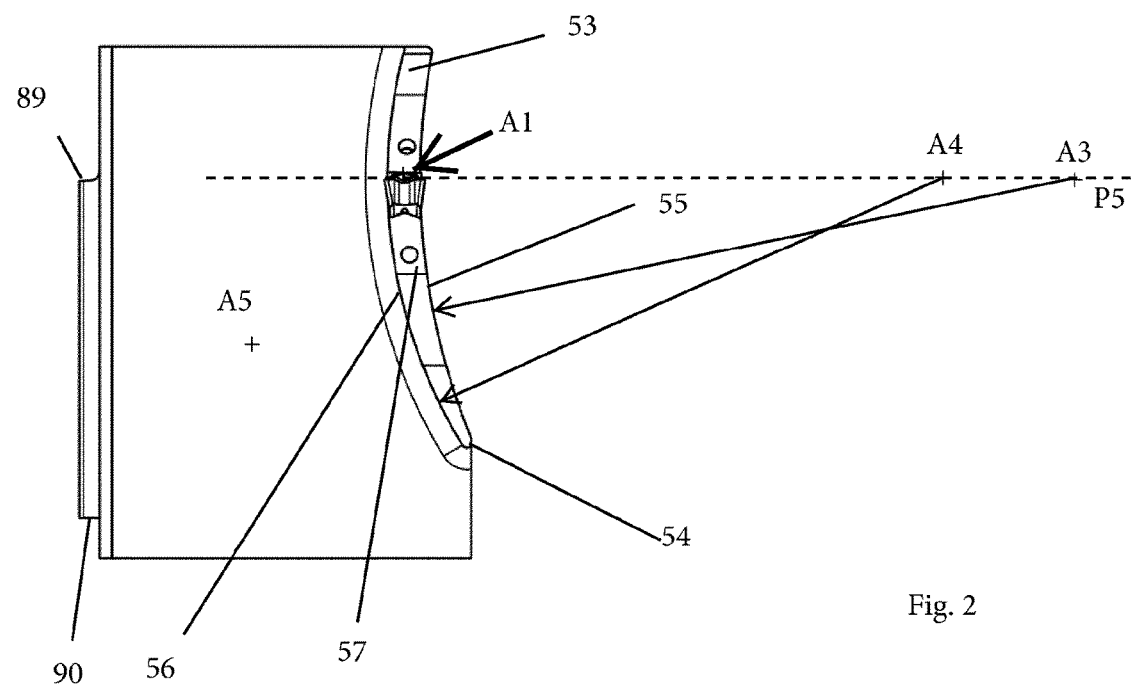
FIG. 2 is a front view of the face grooving tool in FIG. 1.

Reference is now made to FIG. 2. The second side surface 56 of is curved around a second side surface axis of curvature A4 parallel to the longitudinal axis A1 of the blade portion, such that all parts of the second side surface 56 has a constant distance to the second side surface axis of curvature A4. The first side surface 55 is curved around a first side surface axis of curvature A3, such that all parts of the first side surface 55 has a constant distance to the first side surface axis of curvature A3. The first and second side surface axes of curvature A3, A4 are parallel to the longitudinal axis A1 of the blade portion. The first side surface 55 is facing the first and second side surface axes of curvature A3, A4. A distance from the first side surface 55 to the first side surface axis of curvature A3 is shorter than a distance from the first side surface 55 to the second side surface axis of curvature A4.

The longitudinal center axis A5 of the clamping portion is parallel to the longitudinal axis A1.

The bottom surface 90 of the clamping portion 83 is located in a plane parallel to P5, where P5 is a reference plane in which at least 50% of the cutting edge is located.

The longitudinal axis A1 is located in the reference plane P5.

A distance from the bottom surface 90 of the clamping portion 83 to the top surface 53 of the blade portion 52 is greater than a distance from the bottom surface 90 of the clamping portion 83 to the top surface 89 of the clamping portion 83.

Figure 3:
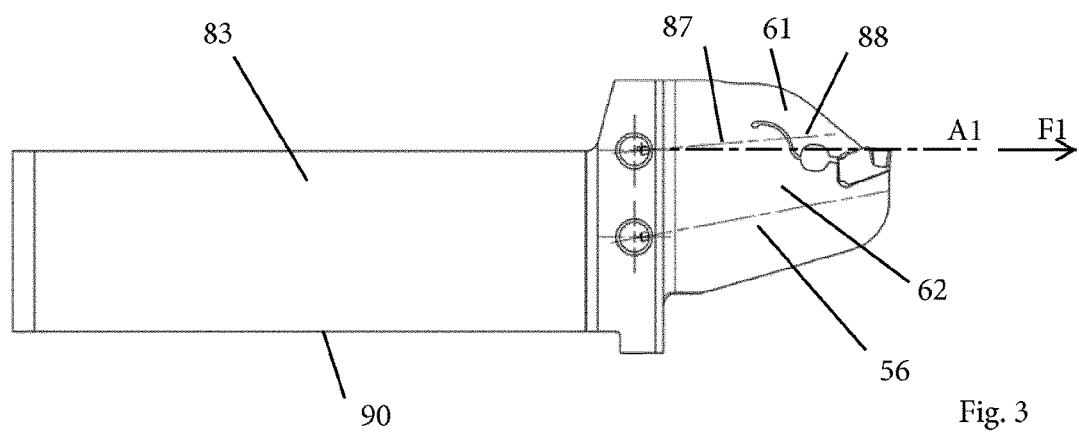
FIG. 3 is a first side view of the face grooving tool in FIG. 1.

Reference is now made to FIG. 3. It can be seen that the longitudinal axis A1 of the blade portion coincides a primary cutting feed direction F1 of the blade portion. The blade portion 52 comprises a fluid channel, comprising a first fluid channel portion 87 in the lower blade portion 62 having an outlet opening into the slit 59, and a second fluid channel portion 88 in the upper blade portion 61 having an inlet opening into the slit 59. The second fluid channel portion 88 is a through hole. The first and second fluid channel portions 87, 88 extend along a common axis, and extend between the first and second side surfaces. In FIG. 3, the second side surface 56 is facing the viewer. The bottom surface 90 of the clamping portion 83 is located in a plane parallel to the longitudinal axis A1 of the blade portion.

Figure 4:
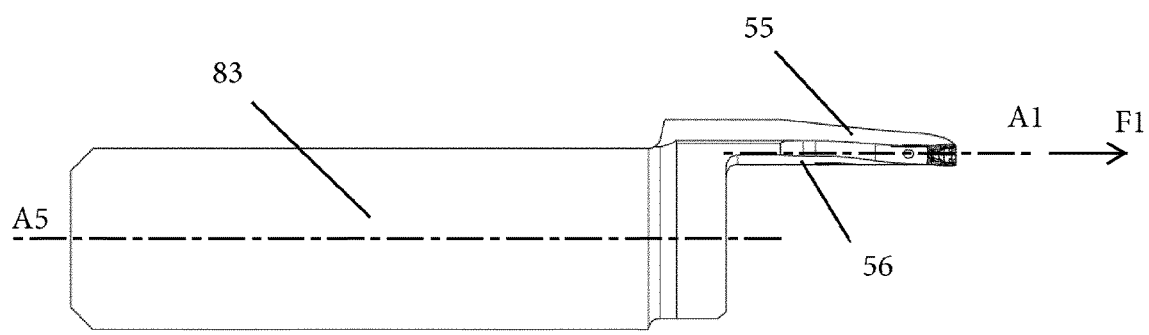
FIG. 4 is a top view of the face grooving tool in FIG. 1.

Reference is now made to FIG. 4. The first and second side surface axes of curvature A3, A4 are parallel to the longitudinal center axis A5 of the clamping portion 83 and the longitudinal axis A1 of the blade portion, which coincides with a primary cutting feed direction F1 of the blade portion. Distances from the first side surface 55 to the first and second side surface axes of curvature A3, A5 is greater than distances from the second side surface 56 to the first and second side surface axes of curvature A3, A4.

Figure 5:
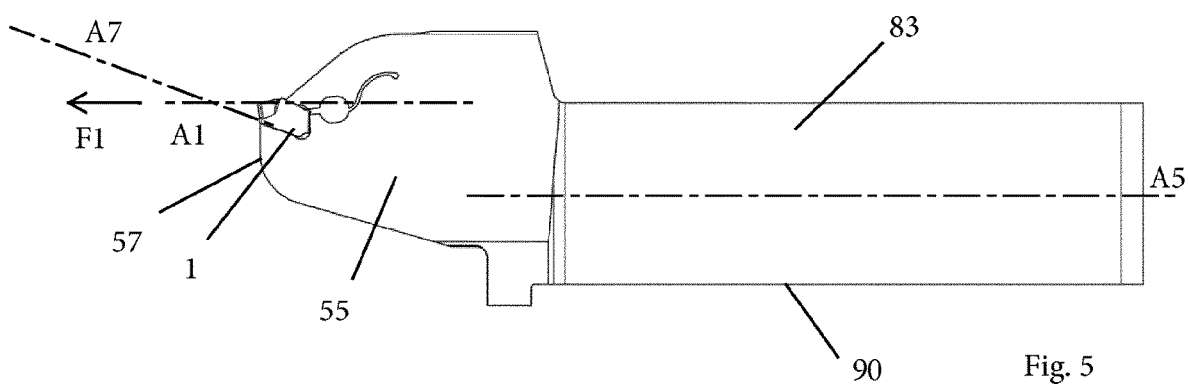
FIG. 5 is a second side view of the face grooving tool in FIG. 1.

Reference is now made to FIG. 5. A lower support surface central axis A7 forms an angle 1-45°, in FIG. 5 the angle is 15-25°, relative to the longitudinal axis A1 in a side view, as shown in FIG. 5, such that the lower support surface central axis A7 and the longitudinal axis A1 in a side view converge forward of the front end 57. The lower support surface central axis A7 forms an identical angle relative to the longitudinal center axis A5 of the clamping portion 83.

The lower support surface is a support surface for the grooving insert 1 located in the insert seat. In FIG. 5, the first side surface 55 is facing the viewer. The lower support surface central axis A7 intersects a plane comprising the bottom surface 90 of the clamping portion 83 rearward of the front end 57.

Figure 6:
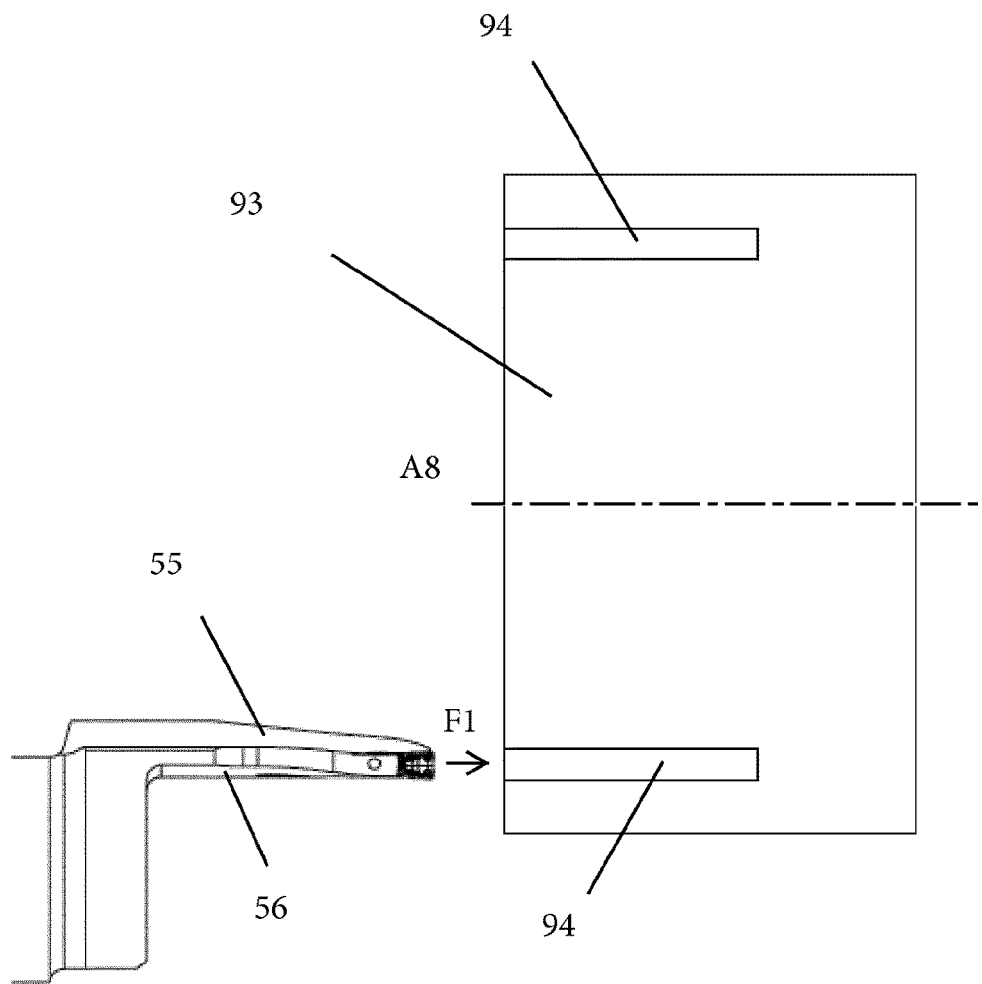
FIG. 6 is a top view of the face grooving tool in FIG. 1 and a metal work piece.

Reference is now made to FIG. 6. A metal work piece 93 is rotatable around a rotation axis A8. When the face grooving tool is moved relative in a primary cutting feed direction F1 of the blade portion, a circular groove 94 is formed in the metal work piece 93, having a center thereof coinciding with the rotation axis A8 of the metal work piece 93. The width of the circular groove 98, i.e. the distance between a radially inner and a radially outer side wall of the circular groove 98, corresponds to the width of the cutting edge of the grooving insert mounted in the insert seat of the face grooving tool body. A distance from the first side surface 55 to the first side surface axis of curvature is equal or greater than a distance from the rotation axis A8 of the metal work piece 93 to the radially inner side wall of the circular groove 98.

A distance from the second side surface 56 to the second side surface axis of curvature is equal or smaller than a distance from the rotation axis A8 of the metal work piece 93 to the radially outer side wall of the circular groove 98. The depth of the circular groove 94, i.e. the extension parallel to the rotation axis A8 of the metal work piece 93, is equal to or smaller than a distance, measured along the longitudinal axis of the blade portion, from the rear end of the blade portion to the active cutting edge of the grooving insert.

Figure 7:
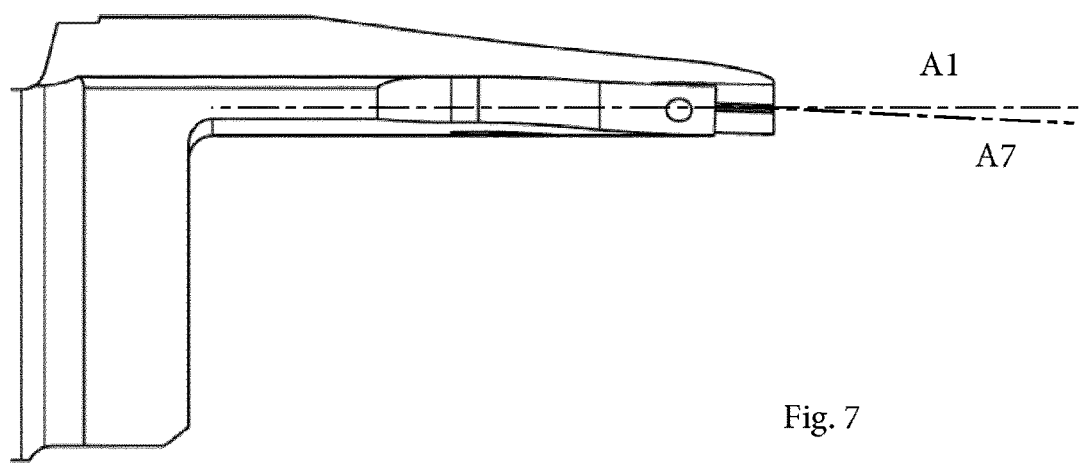
FIG. 7 is a top view of the face grooving tool body in FIG. 1.

Reference is now made to FIG. 7. Here it is shown that the lower support surface central axis A7 in a top view forms an angle 0.5-5.0°, in FIG. 7 the angle is 2-3°, relative to the longitudinal axis A1 of the blade portion.

Figure 8:
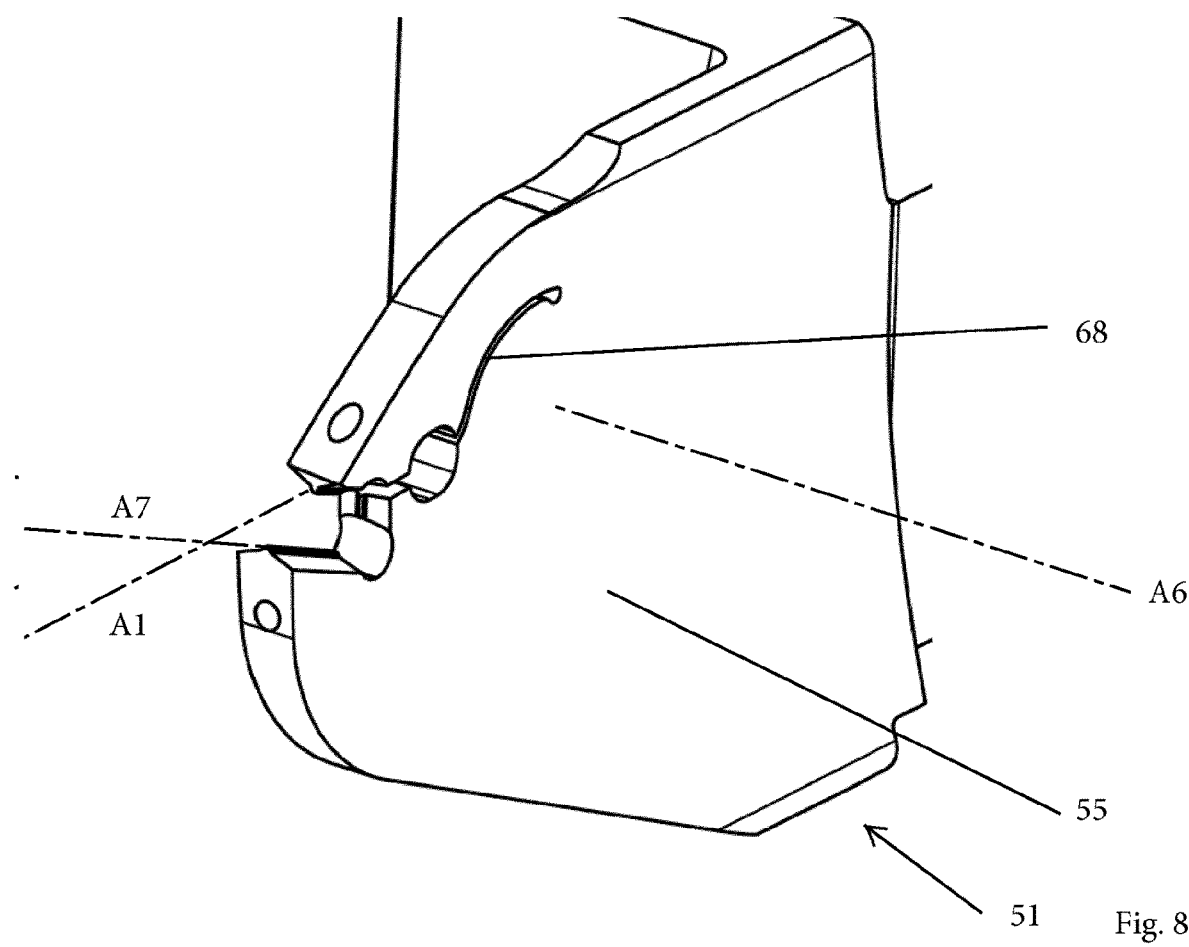
FIG. 8 is a perspective view of the face grooving tool body in FIG. 1.

Reference is now made to FIG. 8, showing a portion of the face grooving tool body 51, where it is shown that the lower support surface central axis A7 and the longitudinal axis A1 converge forward of the front end 57. The slit comprises a slit portion 68, wherein at least a major portion of the slit portion 68 is curved around an axis A6, which intersect the lower blade portion, which axis A6 is substantially perpendicular to the longitudinal axis A1 of the blade portion. The first side surface 55 is shown.

Figure 9:
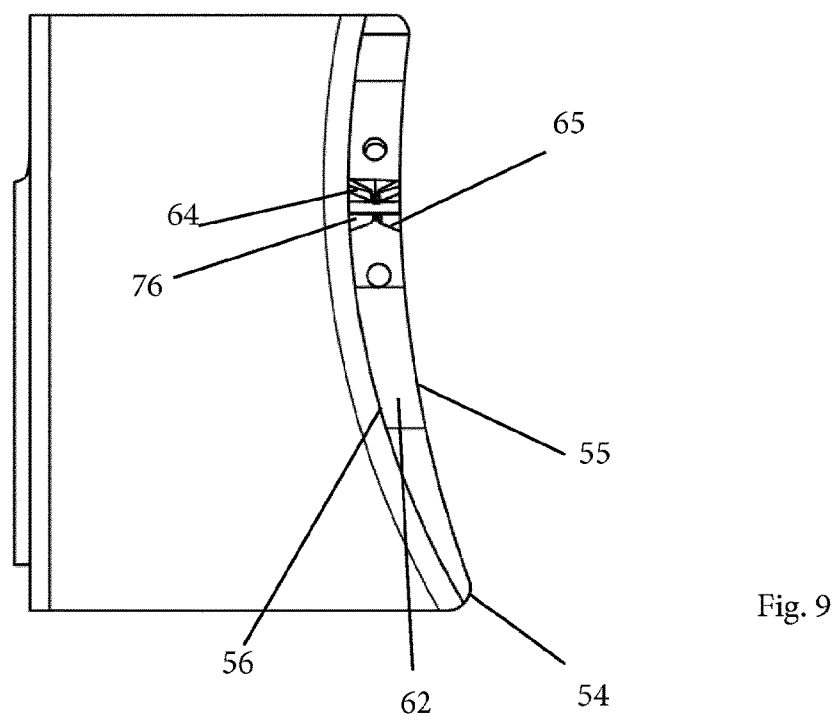
FIG. 9 is a front view of the face grooving tool body in FIG. 1.

Reference is now made to FIG. 9, which show that the insert seat comprises an upper clamping surface 64 formed in the upper blade portion, an opposite lower support surface 65 formed in the lower blade portion, and a rear support surface 76 formed in the lower blade portion. The insert seat extends between the first and second side surfaces 55, 56 of the blade portion. As can also be seen in e.g. FIG. 8, the upper clamping surface 64, the lower support surface 65 and the rear support surface 76 each comprise a central structure, in the form of a central ridge, separating non-coplanar surfaces. A width of the lower blade portion 62, measured as the distance between the first and second side surfaces 55, 56 of the lower blade portion 62, is decreasing from the lower support surface 65 towards the bottom surface 54 of the lower blade portion 62.

Figure 10:
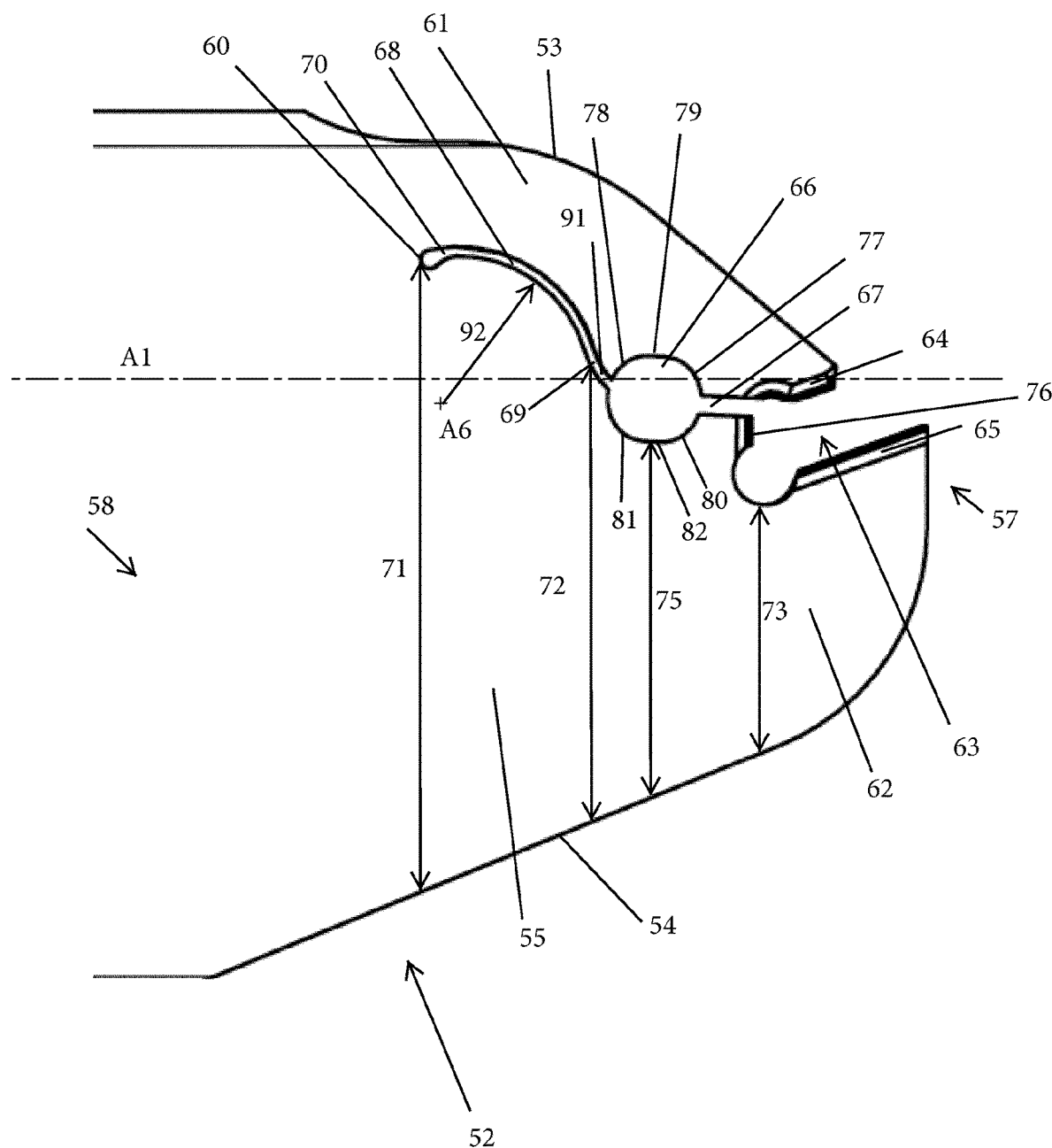
FIG. 10 is a mirror view of the face grooving tool body in FIG. 5.

Reference is now made to FIG. 10, which is a mirror view of FIG. 5. The blade portion 52 comprises a top surface 53, an opposite bottom surface 54, a first side surface 55 and an opposite second side surface, a front end 57 and an opposite rear end 58. A distance between the top and bottom surfaces 53, 54 is increasing from the front end 59 towards the rear end 58 up to at least the rear end of the slit portion 59. An upper blade portion 61 associated with the top surface 53 and a lower blade portion 62 associated with the bottom surface 54, are separated by a slit extending from the front end 57 to a rear slit end 60. The slit comprises, adjacent to the front end 57, an insert seat 63 for a grooving insert. The insert seat 63 comprises an upper clamping surface 64 formed in the upper blade portion 61, an opposite lower support surface 65 formed in the lower blade portion 62, and a rear support surface 76 formed in the lower blade portion 62. The lower support surface 65 extends a greater distance from the rear end 58 than the distance the upper clamping surface 64 extends from the rear end 58. The slit 59 comprises a key hole 66, and a slit portion 68 extending between a slit portion front end 69 and a slit portion rear end 70. The longitudinal axis A1 intersects the key hole 66. The longitudinal axis A1 intersects the upper clamping surface 64. The slit portion 68 is located between the rear slit end 60 and the key hole 66. A slit gap intersecting a center of the key hole 66 is greater than a slit gap at the slit portion 68. The key hole 66 is located between the slit portion 68 and the insert seat 63. The key hole 66 comprises a first and a second concave surface 77, 78, formed in the upper blade portion 61, and connected by a first flat surface 79. The key hole 66 further comprises a third and a fourth concave surface 80, 81, formed in the lower blade portion 62, and connected by a second flat surface 82. The key hole 66 comprises substantially opposite openings towards the insert seat 63 and towards the slit portion 68, respectively. In other words, the key hole is part of the slit. The slit comprises a connecting portion 67, connecting the key hole 66 and the insert seat 63, intersecting the insert seat 63 between the rear support surface 76 and the upper clamping surface 64. A second connecting portion 91, convex in side view, is located between and connecting the key hole 66 and the slit portion 68. At least a major portion of the slit portion 68 is curved or substantially curved around an axis A6, intersecting the lower blade portion 62, at a radius of curvature 92. The slit portion 68 or a major portion of the slit portion 68 is concave or substantially concave in a side view as seen in e.g. FIG. 10. In other words, the slit portion 68 has the shape of a concave function in a side view. The radius of curvature 92 is substantially equal to, i.e. 75%-125%, of a shortest distance between the slit portion front end 69 and the slit portion rear end 70. The length of the slit portion 68 as defined as a shortest distance between the slit portion front end 69 and the slit portion rear end 70 is greater than the length of the key hole 66. The slit portion 68 is located between the rear slit end 60 and the insert seat 63. A distance 71 from the bottom surface 54 to the rear slit end 60 is greater than a distance 72 from the bottom surface 54 to the slit portion 68 front end 69 or to the second connecting portion 91. The slit portion 68 has a constant or substantially constant slit gap. The first side surface 55 of the lower blade portion 62 is formed as a continuous surface which runs uninterrupted from the slit to the bottom surface 54. A distance 73 from the bottom surface 54 to a lowest point of the insert seat 63 is smaller than a distance 75 from the bottom surface 54 to the key hole 66. A distance from rear support surface 76 to the rear slit end 60 is greater than a distance from rear support surface 76 to the front end 57 of the slit portion 68. The rear slit end 60 preferably comprises a border surface in the shape of a circular arc.

Reference is now made to FIG. 11, which is a perspective view of a face grooving tool body according to a second embodiment. The only substantial difference compared to the first embodiment the position of the blade portion relative to the clamping portion 83, and the shape of the clamping portion 83. In the second embodiment, the clamping portion 83 is circular in a cross section, and comprises 4 screw holes. The face grooving tool body is suitable for internal face grooving, i.e. face grooving inside a hole in a metal work piece.

Reference is now made to FIG. 12, which is a perspective view of a face grooving tool body according to a third embodiment. The only substantial difference compared to the first embodiment is the shape of the clamping portion 83. In the third embodiment, the clamping portion 83 is circular in a cross section, and comprises 4 screw holes.

Reference is now made to FIG. 13, which is a perspective view of a face grooving tool body according to a fourth embodiment. The only substantial difference compared to the first embodiment is the shape of the second side surface 56. More specifically, a rear portion of lower blade portion 56 is widened, rearward of the key hole 66. Thus, the mechanical strength of the lower blade portion 56 is further increased.

Reference is now made to FIGS. 14-16 which shows a face grooving tool body according to a fifth embodiment. The only substantial difference compared to the first embodiment is that the longitudinal center axis A5 of the clamping portion is perpendicular to the longitudinal axis A1. The blade portion, including the first and second side surfaces 55, 56, is identical to the blade portion according to the first embodiment.

Reference is now made to FIGS. 17-23, which show the grooving insert 1 which is part of the face grooving tool in FIG. 1. The grooving insert 1 comprises a front surface 4 and an opposite rear surface 5, a first side surface 6 and an opposite second side surface 7, a top surface 2 and an opposite bottom surface 3.

An area of the top surface 2 in a top view is greater than an area of the bottom surface 3 in a bottom view. The top surface 2 comprises a top front portion 9 and a top rear portion 10. The top front portion 9 comprises a rake face 11 and a cutting edge 8. The cutting edge 8 is partly formed in an intersection between the rake face 11 and the front surface 4, and partly formed in an intersection between the rake face 11 and the first and second side surface 6, 7, respectively. The top front portion 9 comprises a non-planar chip forming surface or a chip forming structure. The front surface 4 is a clearance surface when the face grooving tool in which the grooving insert 1 is mounted is moved in a primary cutting feed direction. The cutting edge 8 extends continuously between a first end point 12 and a second end point 13. The first end point 12 is located in an intersection between the first side surface 6 and the top front portion 9. The second end point 13 is located in an intersection between the second side surface 7 and the top front portion 9. The cutting edge 8, the top front portion 9 and the rake face 11 are arranged symmetrically relative to a first plane P1, which first plane P1 intersects a mid-point 14 of the cutting edge 8 and intersects the rear surface 5.

Figure 20:
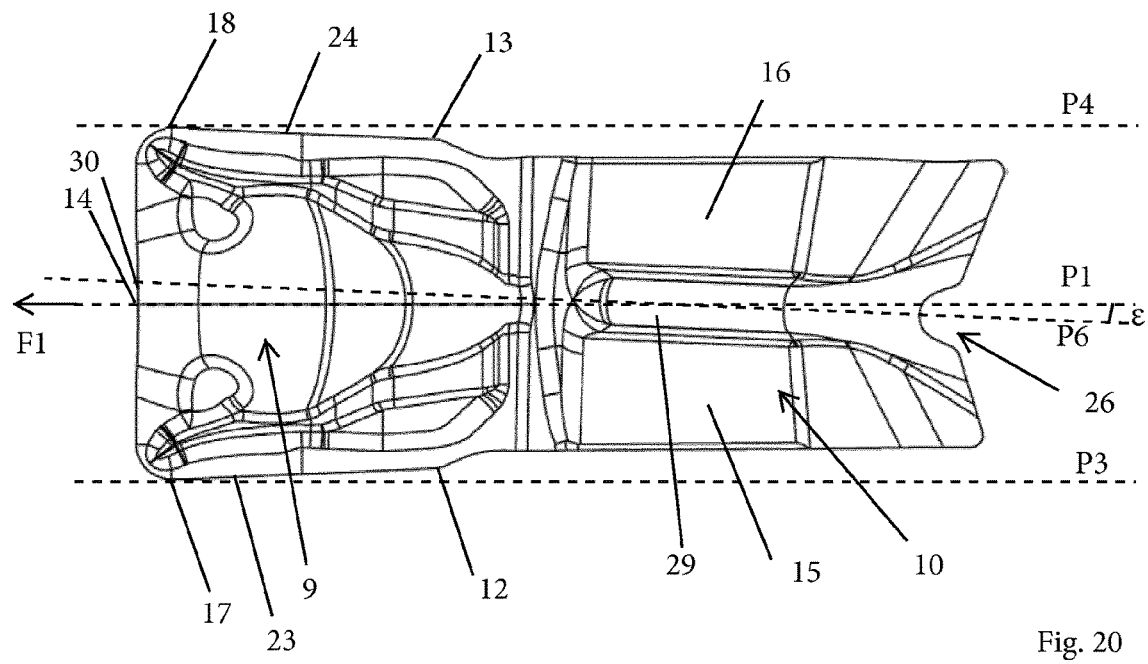
FIG. 20 is a top view of the grooving insert in FIG. 17.
Figure 21:
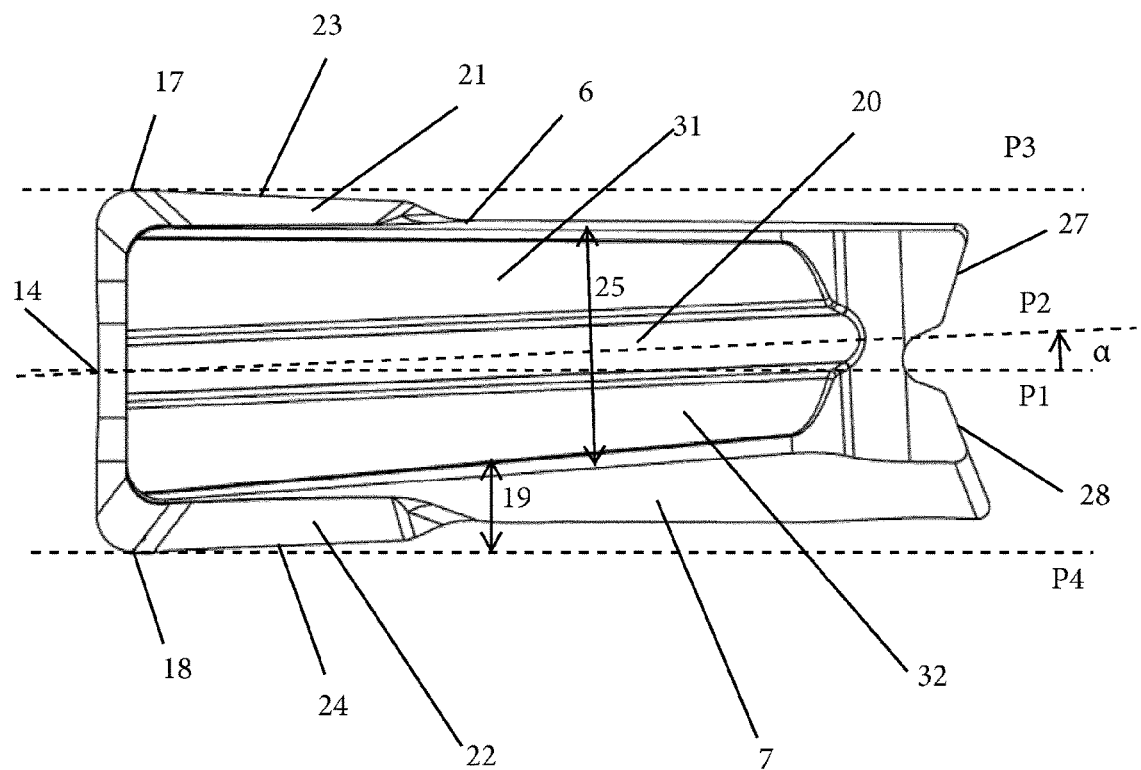
FIG. 21 is a bottom view of the grooving insert in FIG. 17.

As can be seen in e.g. FIG. 20, the cutting edge 8 comprises a main cutting edge portion extending perpendicular to the first plane P1, which is 1.0-20.0 mm, in FIG. 20 the main cutting edge portion is 2.0-4.0 mm.

The main cutting edge portion is connected to the first portion 23 of the cutting edge 8 through a first arc shaped corner cutting edge. The first arc shaped corner cutting edge comprises a first distal edge portion 17.

In a similar manner, the main cutting edge portion is connected to the second portion 24 of the cutting edge 8 through a second arc shaped corner cutting edge. The second arc shaped corner cutting edge comprises a second distal edge portion 17.

The top rear portion 10 comprises a top support surface 15, 16. The bottom surface 3 comprising a bottom support surface 31, 32. The bottom surface 3 is symmetrically or substantially symmetrically arranged in relation to a second plane P2, which second plane P2 intersects the front surface 4 and the rear surface 5.

The first plane P1 and the second plane P2 forms an angle α of 0.5-5.0° relative to each other, which angle α in FIGS. 17-23 is 2.5°. A distance 33 from the bottom surface 3 to a reference plane P5, is increasing away from the front surface 4 towards the rear surface 5. At least 50% of the cutting edge 8, the first end point 12 and the second end point 13 are located in the reference plane P5. The reference plane P5 is perpendicular to the first plane P1. A minor portion of the cutting edge 8, comprising the mid-point 14, is spaced apart from the reference plane P5. The minor portion is symmetrically arranged relative to the mid-point 14, and is concave in a front view, as seen in FIG. 18.

Figure 22:
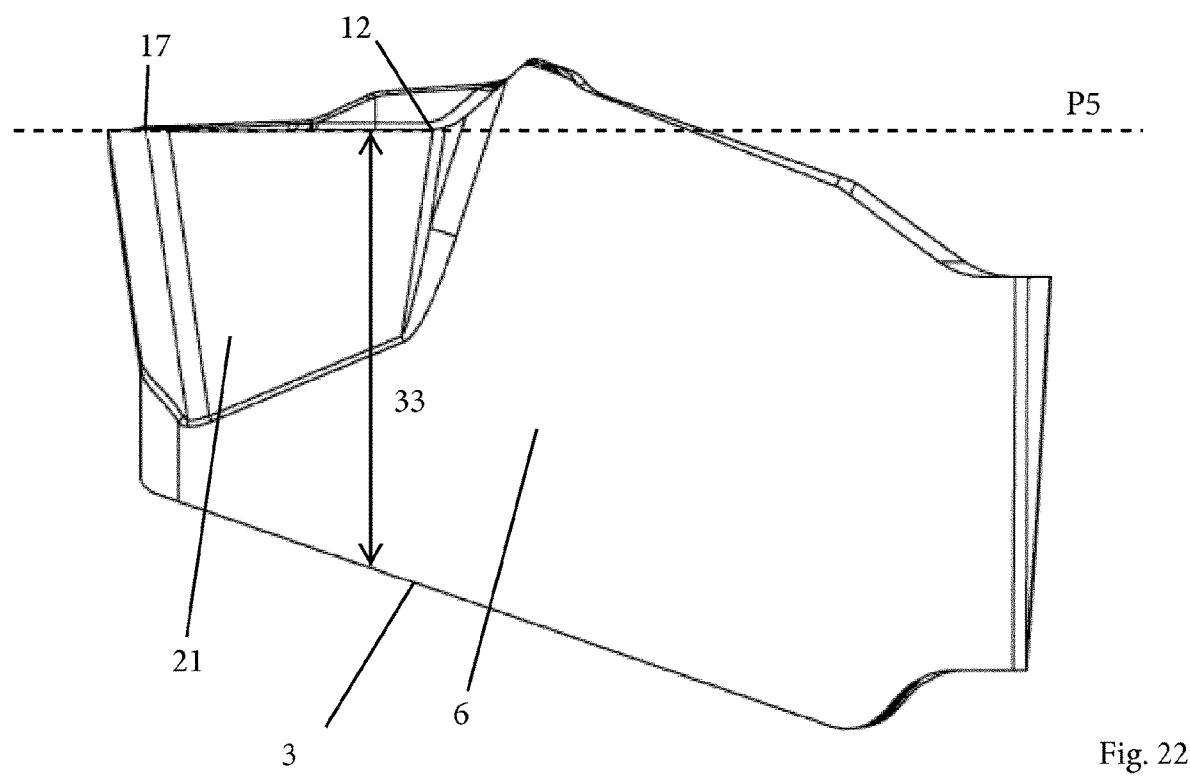
FIG. 22 is a first side view of the grooving insert in FIG. 17.
Figure 23:
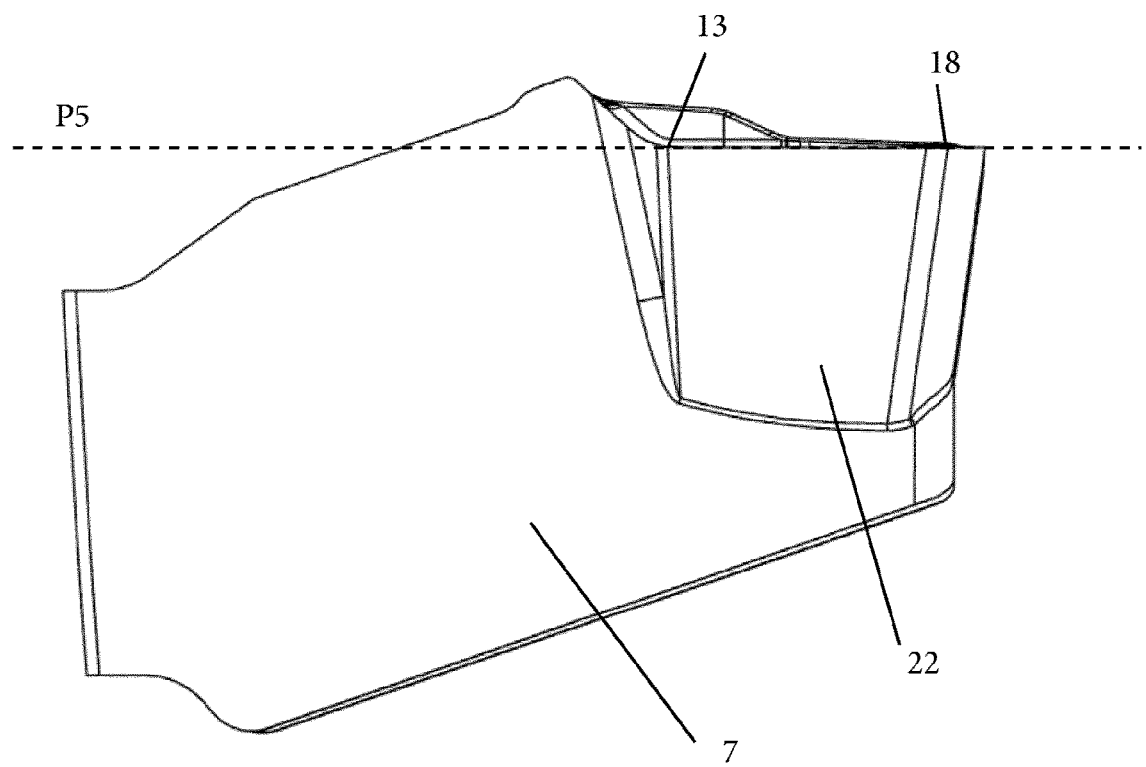
FIG. 23 is a second side view of the grooving insert in FIG. 17.

As seen in FIG. 22 and FIG. 23, in a side view the reference plane P5 and the bottom surface 3 forms an angle relative to each other, which angle is preferably 10-30°.

The cutting edge 8 comprises the first distal edge portion 17, adjacent to the first side surface 6, and the second distal edge portion 18, adjacent to the second side surface 7.

The first and second distal edge portions 17, 18 are the most distal portions of the cutting edge 8 in relation to the first plane P1. When the grooving insert 1 is mounted in the insert seat of the face grooving tool body, and the blade portion is moved in the primary cutting feed direction, the first and second distal edge portions 17, 18 are the surface generating portions of the radially inner and outer side walls of the circular groove formed.

Thus, as can be seen in FIG. 6, the width of the circular groove 98, i.e. the distance between a radially inner and a radially outer side wall of the circular groove 98, corresponds to the distance between the first and second distal edge portions 17, 18.

A third plane P3, parallel to the first plane P1, intersects the first distal edge portion 17. A fourth plane P4, parallel to the first plane P1, intersects the second distal edge portion 18.

A distance 19 from the fourth plane P4 to the bottom support surface 31, 32 is increasing from the front surface 4 towards the rear surface 5.

The bottom surface 3 comprises a first groove 20 symmetrically arranged in relation to the second plane P2 and extending from the front surface 4 to the rear surface 5.

The extension of the first groove 20 corresponds to the extension of the lower support surface 65 central ridge of the insert seat 63. The first side surface 6 comprises a first clearance surface 21 adjacent to a first portion 23 of the cutting edge 8.

The first clearance surface 21 forms a first clearance angle γ in relation to the third plane P3. The second side surface 7 comprises a second clearance surface 22 adjacent to a second portion 24 of the cutting edge 8. The second clearance surface 22 forms a second clearance angle δ in relation to the third plane P3. The second clearance angle δ is larger than the first clearance angle γ. Each of the first and second clearance surfaces 21, 22 and the bottom surface 3 are spaced apart.

An area of the second clearance surface 22 is greater than an area of the first clearance surface 21, as seen in FIGS. 22-23.

A width 25 of the bottom surface 3, perpendicular to the second plane P2, is decreasing away from the front surface 4.

The rear surface 5 comprises a first rear support surface 27 adjacent to the first side surface 6 and a second rear support surface 28 adjacent to the second side surface 7. The rear surface 5 further comprises a second groove 26 extending from the top surface 2 to the bottom surface 3 and extending between the first rear support surface 27 and the second rear support surface 28. An area of the first rear support surface 27 is smaller than an area of the second rear support surface 28.

The grooving insert 1 comprises exactly one cutting edge. Adjacent the rear surface 5 no cutting edge is formed.

The top rear portion 10 comprises a third groove 29 symmetrically or substantially symmetrically arranged in relation to a sixth plane P6. The sixth plane P6 intersects the front surface 4 and the rear surface 5.

The first plane P1 and the sixth plane P6 form an angle ε of 0.5-5.0° relative to each other. Angle ε and angle α are equally large. The second plane P2 and the sixth plane P6 are parallel and spaced apart. A distance from the second side surface 7 to the sixth plane P6 is shorter than a distance from the second side surface 7 to the second plane P2.

The third groove 29 is spaced apart in relation to each of the first and second side surfaces 6, 7. An extension of the third groove 29 intersects the cutting edge 8 at an intersection point 30. The intersection point 30 is spaced apart from the mid-point 14 of the cutting edge 8. A distance from the second side surface 7 to the intersection point 30 is shorter than a distance from the second side surface 7 to the mid-point 14 of the cutting edge 8. The sixth plane P6 intersects the cutting edge 8 at the intersection point 30. The third groove 29 has a main extension along the sixth plane P6.

The top front portion 9 of the grooving insert 1 is wider than the top rear portion 10, where the widths are measured perpendicular to the second plane P2.

The top support surface 15, 16 comprises a first top support surface 15, adjacent to the first side surface 6, and a second top support surface 16, adjacent to the second side surface 7.

The third groove 29 extends between the first and second top support surfaces 15, 16.

The bottom support surface 31, 32 comprises a first bottom support surface 31, adjacent to the first side surface 6, and a second bottom support surface 32, adjacent to the second side surface 7.

The first groove 20 extends between the first and second bottom support surfaces 31, 32.

A width of the second top support surface 16 is increasing towards the rear surface 5, where the width of the second top support surface 16 is measured in a plane perpendicular to the first plane P1

A width each of first top support surface 15, first bottom support surface 31, and the second bottom support surface 32 is decreasing towards the rear surface 5, where the width of the second top support surface 16 is measured in a plane perpendicular to the first plane P1.

Reference is now made to FIGS. 24-30, which show a second grooving insert 1 which is mountable in the face grooving tool body in FIG. 1. The grooving insert 1 differs from the insert shown in FIGS. 17-23 only with regards to the top front portion 9, the cutting edge 8, the front surface 4, and the first and second clearance surfaces 21, 22.

Figure 27:
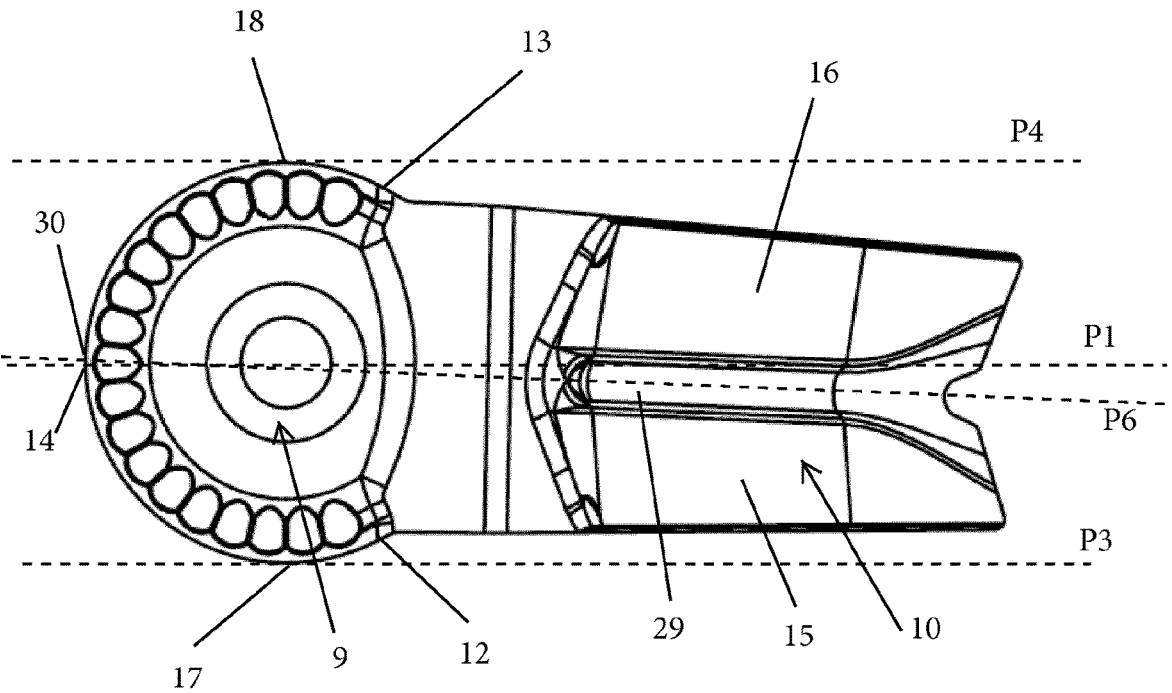
FIG. 27 is a top view of the grooving insert in FIG. 24.
Figure 28:
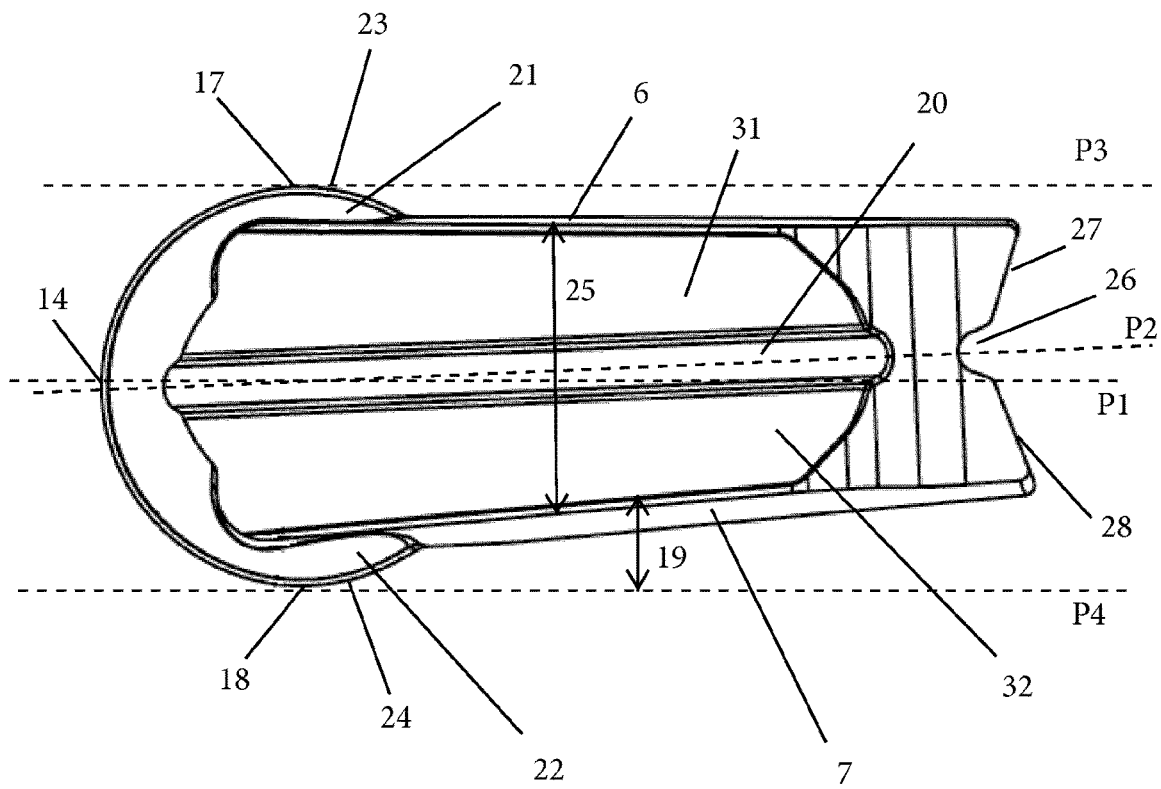
FIG. 28 is a bottom view of the grooving insert in FIG. 24.

The cutting edge 8 of the second grooving insert 1 is shaped as, or extends along, a circular arc, which is best seen in FIG. 27. More specifically, the cutting edge is shaped as a major arc, which subtends an angle greater than 180° but less than 360°. The angle for the second grooving insert 1 is 190°-250°.

In other words, the angle between the first end point 12 and the second end point 13 is 190°-250°.

The cutting edge 8 of the second grooving insert 1 is completely located in the reference plane P5, which is perpendicular to the first plane P1.

The first and second distal edge portions 17, 18 of the second grooving insert 1 is located relatively closer to the rear surface 5, compared to the first and second distal edge portions of the first grooving insert.

The first and second clearance surfaces 21, 22 of the second grooving insert 1 has upper portions, adjacent to the cutting edge 8 which corresponds to the circular arc shape of the cutting edge.

As for the first grooving insert, the first side surface 6 comprises a first clearance surface 21 adjacent to a first portion 23 of the cutting edge 8 forming a first clearance angle γ in relation to the third plane P3. Likewise, the second side surface 7 comprises a second clearance surface 22 adjacent to a second portion 24 of the cutting edge 8. The second clearance surface 22 forms a second clearance angle δ in relation to the third plane P3. The second clearance angle δ is larger than the first clearance angle γ. Each of the first and second clearance surfaces 21, 22 and the bottom surface 3 are spaced apart.

Figure 29:
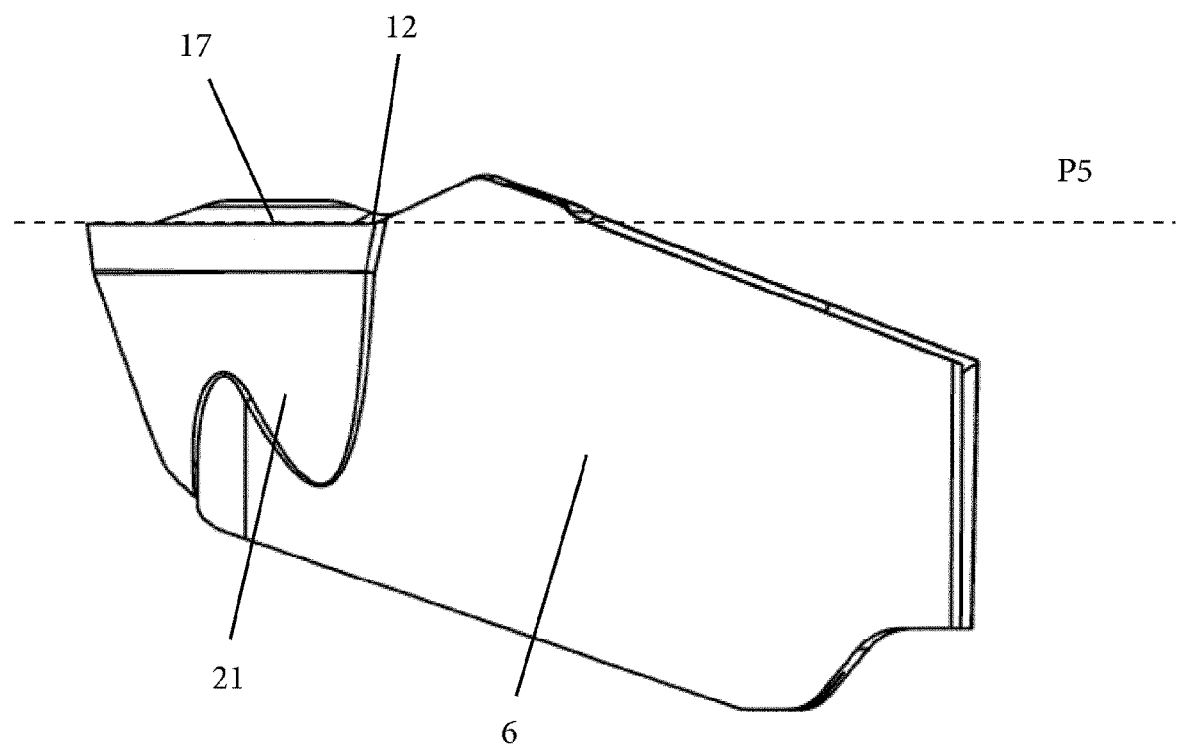
FIG. 29 is a first side view of the grooving insert in FIG. 24.
Figure 30:
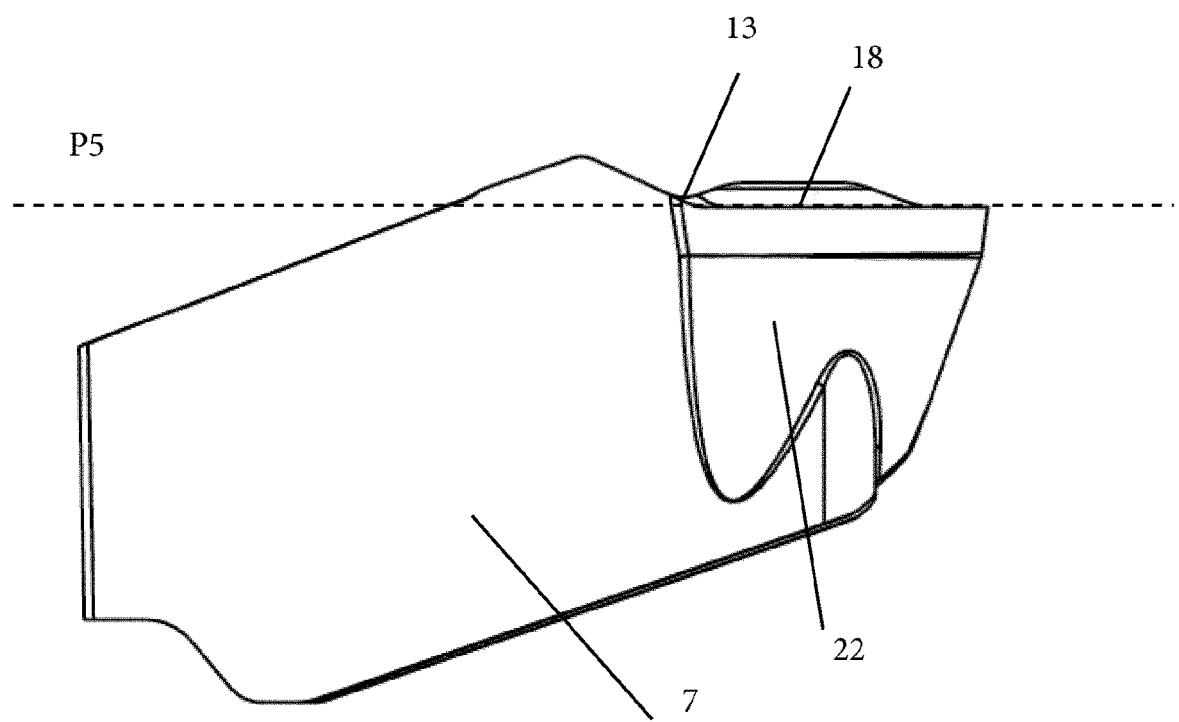
FIG. 30 is a second side view of the grooving insert in FIG. 24.

An area of the second clearance surface 22 is greater than an area of the first clearance surface 21, as seen in FIGS. 29-30.

Regardless of it is the first grooving insert 1 or if it is the second grooving insert 1 which is mounted or positioned in the insert seat 63 of the face grooving tool body 51, the top support surface 15, 16 of the grooving insert 1 is in contact with the upper clamping surface 64, the bottom support surface 31, 32 of the grooving insert 1 is in contact with the lower support surface 65, and the rear support surface 27, 28 of the grooving insert 1 is in contact with the insert seat 63 rear support surface 76. In a corresponding manner, the first side surface 55 of the blade portion 52 is adjacent to the first side surface 6 of the grooving insert 1, and the second side surface 56 of the blade portion 52 is adjacent to the second side surface 7 of the grooving insert 1. Formulated differently, the first side surface 55 of the blade portion 52 and the first side surface 6 of the grooving insert 1 are facing the same direction, and the second side surface 56 of the blade portion 52 and the second side surface 7 of the grooving insert 1 are both facing an opposite direction.

In the present application, the use of terms such as "including" is open-ended and is intended to have the same meaning as terms such as "comprising" and not preclude the presence of other structure, material, or acts. Similarly, though the use of terms such as "can" or "may" is intended to be open-ended and to reflect that structure, material, or acts are not necessary, the failure to use such terms is not intended to reflect that structure, material, or acts are essential. To the extent that structure, material, or acts are presently considered to be essential, they are identified as such. Terms such as "upper", "lower", "top", "bottom", "forward" and "rear" refer to features as shown in the current drawings and as perceived by the skilled person.

The invention claimed is:

1. A face grooving tool body comprising a blade portion including a top surface and an opposite bottom surface, a first side surface and an opposite second side surface, a front end and an opposite rear end, a longitudinal axis of the blade portion coinciding with a primary cutting feed direction of the blade portion, an upper blade portion associated with the top surface and a lower blade portion associated with the bottom surface, wherein the upper and lower blade portions are separated by a slit extending from the front end to a rear slit end, the slit intersecting the first and second side surfaces, the slit including an insert seat for a grooving insert, wherein the insert seat opens in the front end, the insert seat including an upper clamping surface formed in the upper blade portion, an opposite lower support surface formed in the lower blade portion, and a rear support surface formed in the lower blade portion, wherein the lower support surface extends a greater distance from the rear end than a distance the upper clamping surface extends from the rear end, wherein the second side surface of the lower blade portion is curved around a second side surface axis of curvature extending parallel to the longitudinal axis, wherein a key hole is formed in the blade portion, the slit including a slit portion extending between a slit portion front end and a slit portion rear end, the slit portion being located between the rear slit end and the insert seat, wherein a distance from the bottom surface to rear slit end is greater than a distance from the bottom surface to the slit portion front end, the distances being measured in planes perpendicular to the longitudinal axis, and wherein the slit portion or at least 50% of a length of the slit portion has a shape of a concave function in a side view.

2. The face grooving tool body according to claim 1, wherein the slit includes the key hole, wherein the slit portion is located between the rear slit end and the key hole, a slit gap intersecting a center of the key hole being greater than a slit gap at the slit portion.

3. The face grooving tool body according to claim 1, wherein a width of the lower blade portion, measured as the distance between the first and second side surfaces of the lower blade portion decreases from the lower support surface towards the bottom surface of the lower blade portion.

4. The face grooving tool body according to claim 1, wherein the first side surface is curved around a first side surface axis of curvature, wherein the first side surface axis of curvature is parallel to the longitudinal axis, wherein second side surface is curved around the second side surface axis of curvature, wherein the first side surface faces the first and second side surface axes of curvature, and wherein a distance from the first side surface to the first side surface axis of curvature is shorter than a distance from the first side surface to the second side surface axis of curvature.

5. The face grooving tool body according to claim 1, wherein a lower support surface central axis forms an angle of 1-45° relative to the longitudinal axis in a side view such that the lower support surface central axis and the longitudinal axis in a side view converge forward of the front end.

6. The face grooving tool body according to claim 1, wherein a distance from a rear central end of the lower support surface to the first side surface is shorter than a distance from a corresponding front central end of the lower support surface to the first side surface, where said distances are measured in planes perpendicular to the longitudinal axis.

7. The face grooving tool body according to claim 1, wherein the slit portion has a constant or substantially constant slit gap.

8. The face grooving tool body according to claim 1, wherein first and second side surfaces of the lower blade portion are formed as continuous surfaces, which run uninterrupted from the slit to the bottom surface.

9. The face grooving tool body according to claim 1, wherein the blade portion includes a fluid channel, the fluid channel having a first fluid channel portion in the lower blade portion and having an outlet opening into the slit, wherein the fluid channel includes a second fluid channel portion in the upper blade portion having an inlet opening into the slit, wherein the second fluid channel portion is a through hole, and wherein the first fluid channel portion and the second fluid channel portion extend along a common axis.

10. The face grooving tool body according to claim 1, wherein a distance from the bottom surface to a lowest point of the insert seat is smaller than a distance from the bottom surface to the key hole, the distances being measured in planes perpendicular to the longitudinal axis.

11. The face grooving tool body according to claim 1, wherein the face grooving tool body includes a clamping portion extending along a longitudinal center axis which is parallel to or perpendicular to the longitudinal axis, the clamping portion including a top surface and an opposite bottom surface, and wherein a distance from the bottom surface of the clamping portion to the top surface of the blade portion is greater than a distance from the bottom surface of the clamping portion to the top surface of the clamping portion, the distances are being measured in planes perpendicular to the longitudinal axis, and wherein the blade portion is permanently connected to the clamping portion.

12. The face grooving tool body according to claim 1, wherein the distance between the top and bottom surfaces, measured in planes perpendicular to the longitudinal axis, increases from the front end towards the rear end up to at least the rear end of the slit portion.

13. A face grooving tool comprising:
 a face grooving tool body according to claim 1; and
 a grooving insert positioned in the insert seat, the grooving insert including a top support surface in contact with the upper clamping surface, an opposite bottom support surface in contact with the lower support surface, and a rear support surface in contact with the insert seat rear support surface, a first side surface and an opposite second side surface, a cutting edge extending continuously or substantially continuously between a first end point and a second end point, wherein the cutting edge is arranged symmetrically or substantially symmetrically relative to a first plane, wherein the first plane intersects a mid-point of the cutting edge and intersects the rear surface, wherein at least 50% of the cutting edge is located in a reference plane, and wherein the longitudinal axis extends in the intersection between the first plane and the reference plane.

14. A face grooving tool comprising:

a face grooving tool body according to claim 5; and a grooving insert positioned in the insert seat, the grooving insert including a front surface and an opposite rear surface, a first side surface and an opposite second side surface, a top surface and an opposite bottom surface, the top surface including a top front portion and a top rear portion, the top front portion including a rake face and a cutting edge, the cutting edge being at least partly formed in an intersection between the rake face and the front surface, wherein the cutting edge extends continuously or substantially continuously between a first end point and a second end point, the cutting edge being arranged symmetrically or substantially symmetrically relative to a first plane and including the longitudinal axis, wherein the first plane and the longitudinal axis intersects a mid-point of the cutting edge and intersects the rear surface, the top rear portion including a top support surface in contact with the upper clamping surface, the bottom surface including a bottom support surface in contact with the lower support surface, wherein the bottom surface is symmetrically or substantially symmetrically arranged in relation to a second plane, the second plane intersecting the front surface and the rear surface, and wherein the first plane and the second plane form an angle of 0.5-5.0° relative to each other.

* * * * *